(12) United States Patent
Sato

(10) Patent No.: US 8,199,245 B2
(45) Date of Patent: Jun. 12, 2012

(54) IMAGING DEVICE AND FOCUSING SCREEN REPLACEMENT MECHANISM

(75) Inventor: Masami Sato, Chiba (JP)

(73) Assignee: Sony Corporation, Tokyo (JP)

( * ) Notice: Subject to any disclaimer, the term of this patent is extended or adjusted under 35 U.S.C. 154(b) by 352 days.

(21) Appl. No.: 12/457,569

(22) Filed: Jun. 16, 2009

(65) Prior Publication Data

US 2010/0007783 A1 Jan. 14, 2010

(30) Foreign Application Priority Data

Jul. 11, 2008 (JP) .................................. 2008-181116

(51) Int. Cl.
*H04N 5/225* (2006.01)

(52) U.S. Cl. ....................... 348/340; 348/341; 348/374

(58) Field of Classification Search .................. None
See application file for complete search history.

(56) References Cited

U.S. PATENT DOCUMENTS

| | | | | |
|---|---|---|---|---|
| 3,174,417 A | * | 3/1965 | Sauer et al. | 396/354 |
| 4,132,472 A | * | 1/1979 | Urano et al. | 396/281 |
| 4,168,116 A | * | 9/1979 | Goldberg | 396/91 |
| 4,187,016 A | * | 2/1980 | Ishizaka | 396/152 |
| 4,338,010 A | * | 7/1982 | Takahashi | 396/152 |
| 4,346,973 A | * | 8/1982 | Katsuma et al. | 396/152 |
| 4,365,883 A | * | 12/1982 | Takaoka et al. | 396/152 |
| 4,693,577 A | * | 9/1987 | Sasagaki et al. | 396/384 |
| 5,264,887 A | * | 11/1993 | Fukahori | 396/447 |
| 5,734,428 A | * | 3/1998 | Suda et al. | 348/341 |
| 6,085,045 A | * | 7/2000 | Tani | 396/148 |
| 7,046,925 B2 | * | 5/2006 | Kaneko et al. | 396/113 |
| 7,616,884 B2 | * | 11/2009 | Kaneko et al. | 396/296 |
| 2004/0017480 A1 | * | 1/2004 | Higashihara | 348/207.99 |

FOREIGN PATENT DOCUMENTS

| | | |
|---|---|---|
| JP | 61-145923 U | 9/1986 |
| JP | 08-007959 A | 1/1996 |
| JP | 2001-174880 | 6/2001 |
| JP | 2006-022624 A | 1/2006 |
| JP | 2006022624 A * | 1/2006 |
| JP | 2007-233312 A | 9/2007 |
| JP | 2007233312 A * | 9/2007 |

OTHER PUBLICATIONS

JP2007-233312—Machine translation of JP-2007-233312-A.*
JP2006-022624—Machine Translation of JP-2006-022624-A.*
English Language translation of the Japanese Office Action issued Jun. 1, 2010 for corresponding Japanese Application No. 2008-181116.
Japanese Office Action issued Oct. 26, 2010 for corresponding Japanese Application No. 2008-181116.

* cited by examiner

Primary Examiner — Sinh Tran
Assistant Examiner — Jason Flohre
(74) Attorney, Agent, or Firm — Rader Fishman & Grauer, PLLC

(57) ABSTRACT

Disclosed herein is an imaging device including a device main body, a focusing screen holding member configured to detachably hold a focusing screen, and a locking member configured to be provided between the focusing screen holding member and a lens attachment part of the device main body.

7 Claims, 21 Drawing Sheets

IMAGING DEVICE AND FOCUSING SCREEN REPLACEMENT MECHANISM

BACKGROUND OF THE INVENTION

1. Field of the Invention

The present invention relates to an imaging device such as a digital camera, and particularly to a focusing screen replacement mechanism of the imaging device.

2. Description of the Related Art

In a viewing optical system of a single-lens reflex camera, an optical image that has passed through a photographic lens and has been reflected by a main mirror is formed on a focusing screen. Then this optical image further passes through a pentaprism, an eyepiece, a finder window, and so on to reach the eye of a viewer (user). The viewer visually recognizes such an optical image and thereby can check the composition and so on of the photographing.

There are needs to use various kinds of focusing screens as the above-described focusing screen. In particular, professional photographers and semiprofessional photographers (high amateurs) have a need to use appropriate one among various kinds of focusing screens according to the photographing condition and so on.

For example, there is a focusing screen different from normal focusing screens in the appearance of an optical image dependent on the degree of focusing. For this focusing screen, processing with roughness different from that of the normal focusing screens is performed for the ground-glass-like surface (mat surface) thereof so that an image may be sharply seen only when the focused state is obtained more accurately. This allows a viewer to find the focused state more clearly.

Furthermore, there is also a focusing screen into which lattice lines are carved. This focusing screen allows a viewer to decide the composition with reference to the lattice lines (grid) disposed in the visual field.

In order to allow such various focusing screens to be easily replaced, some imaging devices include a mechanism for attaching/detaching focusing screens (focusing screen replacement mechanism) (refer to e.g. Japanese Patent Laid-open No. 2001-174880 (hereinafter, Patent Document 1)).

As shown in FIG. 26, this focusing screen replacement mechanism is provided around a focusing screen 98. In particular, a locking member 99 and so on for focusing screen replacement operation is provided in the opening on the inner circumference side of an annular lens mount part (on the main body side).

SUMMARY OF THE INVENTION

Because the distance from the photographic lens to the image forming plane (imaging plane) is fixed in advance for example, the above-described focusing screen replacement mechanism is desired to be housed in a limited space in the camera main body.

Furthermore, in some single-lens reflex digital cameras, the full size (35 mm film size), which is larger than the APS (specifically, APS-H) size, is employed as the image sensor size.

The increase in the image sensor size leads to increase in the focusing screen size. Therefore, the restrictions on the space for disposing the focusing screen replacement mechanism become very severe. Under such restrictions, adjustment on the order of millimeters or sub-millimeters is desired for example.

In particular, the shift from silver salt cameras (film cameras) to digital cameras is being advanced in recent years.

Due to the shift from silver salt cameras to digital cameras, an existing thin film is replaced by an imaging element. Components such as a color filter and cover glass are provided on the subject side of the imaging plane of the imaging element. Therefore, in the single-lens reflex camera, the restrictions on the space for disposing the focusing screen replacement mechanism are more severe.

The following technique is described in e.g. Patent Document 1. Specifically, in the focusing screen replacement mechanism, a protrusion 97e of a focusing screen holding member 97 is inserted into a hole 99h of the locking member 99 to thereby lock the focusing screen holding member 97 (see FIG. 26). In this locked state, the held state of the focusing screen 98 by the focusing screen holding member 97 is maintained.

Furthermore, in this technique, as shown in FIG. 26, a lower end part 99b of the locking member 99 is pulled toward the front side (in the left direction in FIG. 26) to thereby release the engagement between the hole 99h of the locking part 99 and the protrusion 97e of the focusing screen holding member 97. Thereby, the locking of the focusing screen holding member 97 by the locking member 99 is released and the focusing screen holding member 97 is so lowered as to rotate about a predetermined axis and is shifted to the state in which replacement of the focusing screen is possible.

However, in such a technique, it is desired to pull the lower end part 99b of the locking member 99 toward the front side (toward the opening inside the lens mount part (toward the left side in FIG. 26)), and therefore a comparatively large space is desired on the front side (on the device front side) of the locking member 99.

On the other hand, there are the restrictions on the space for disposing the focusing screen replacement mechanism as described above. Therefore, it is difficult to ensure the comparatively large space on the front side of the locking member 99.

There is a need for the present invention to provide a technique that allows saving of the space for a focusing screen replacement mechanism in an imaging device.

According to a first mode of the present invention, there is provided an imaging device including a device main body, a focusing screen holding member configured to detachably hold a focusing screen, and a locking member configured to be provided between the focusing screen holding member and a lens attachment part of the device main body. The focusing screen holding member has a front side portion on the lens attachment part side. The locking member engages with an engagement part provided on the front side portion and locks the focusing screen holding member to thereby maintain the held state of the focusing screen by the focusing screen holding member. If pressing force toward the device backside is given to the front side portion, the elastic deformation of the front side portion and the displacement of the engagement part of the front side portion toward the device backside occur and engagement between the locking member and the engagement part is released.

According to a second mode of the present invention, there is provided a focusing screen replacement mechanism including a focusing screen holding member configured to detachably hold a focusing screen and a locking member configured to engage with an engagement part provided on a front side portion of the focusing screen holding member and lock the focusing screen holding member to thereby maintain the held state of the focusing screen by the focusing screen holding member. If pressing force in a first direction for separating the front side portion from the locking member is given to the front side portion, the elastic deformation of the front side portion and the displacement of the engagement part of the front side portion in the first direction occur and engagement between the locking member and the engagement part is released.

The modes of the present invention eliminate the need to ensure the space for allowing the locking member to move toward the device front side and thus can achieve space saving.

DETAILED DESCRIPTION OF THE PREFERRED EMBODIMENTS

Embodiments of the present invention will be described below based on the drawings.

1. First Embodiment

<1-1. Outline of Configuration>

Figure 1:
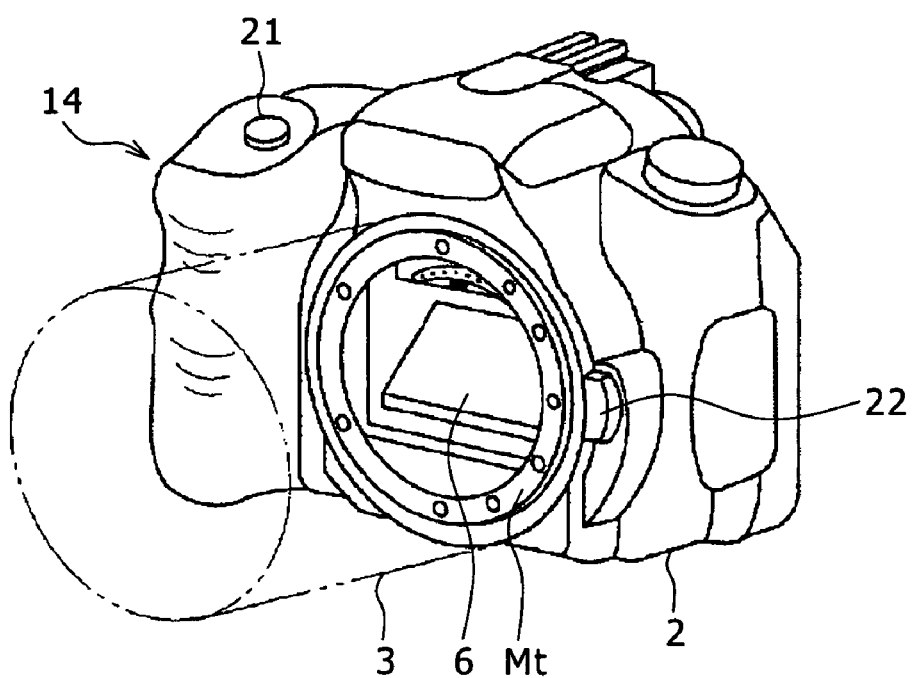
FIG. 1 is a perspective view showing the appearance configuration of an imaging device.

FIG. 1 is a perspective view showing an appearance configuration of an imaging device 1 according to an embodiment of the present invention. This imaging device 1 is configured as a lens-interchangeable single-lens reflex digital camera.

As shown in FIG. 1, this imaging device 1 includes a camera main body (device main body) 2. An interchangeable (removable) photographic lens unit (interchangeable lens) 3 can be attached/detached to/from this camera main body 2. Although FIG. 1 shows the state in which the photographic lens unit 3 is removed, photographic operation is carried out with the photographic lens unit 3 attached. On the other hand, replacement operation of a focusing screen 8 to be described later is carried out in the state in which the photographic lens unit 3 is removed as shown in FIG. 1.

The photographic lens unit 3 is composed mainly of a barrel, a lens group provided inside the barrel, a diaphragm, and so on. This lens group (photographic optical system) includes e.g. a focus lens that moves along the optical axis direction for changing the focus position.

The camera main body 2 has an annular lens mount part (lens attachment part) Mt onto which the photographic lens unit 3 is attached, at substantially the center of the front face thereof. Furthermore, the camera main body 2 has an attachment/detachment button 22 for attachment/detachment of the photographic lens unit 3 near the annular lens mount part Mt.

Furthermore, the camera main body 2 has a grip part 14 for allowing a photographer to grasp the camera main body 2, at the left end of the front face. A shutter release button 21 for directing the start of exposure is provided on the top face of the grip part 14. A cell house and a card house are provided inside the grip part 14. In the cell house, e.g. a lithium ion battery is housed as a power supply of the camera. In the card house, a memory card for recording the image data of photographed images is detachably housed.

The shutter release button 21 is a two-stage detection button that can detect two states of a half-pushed state (state S1) and a full-pushed state (state S2). When the shutter release button 21 is half pushed and the state S1 is obtained, preparatory operation (e.g. AF control operation and AE control operation) for acquiring a still image to be recorded about a subject (actual photographed image) is carried out. Furthermore, when the shutter release button 21 is further pushed down and the state S2 is obtained, photographic operation for the actual photographed image (a series of operation in which exposure operation about the subject image (the optical image of the subject) is carried out by using an imaging element 5 (to be described later) and predetermined image processing is executed for the image signal obtained by this exposure operation) is carried out.

Figure 2:
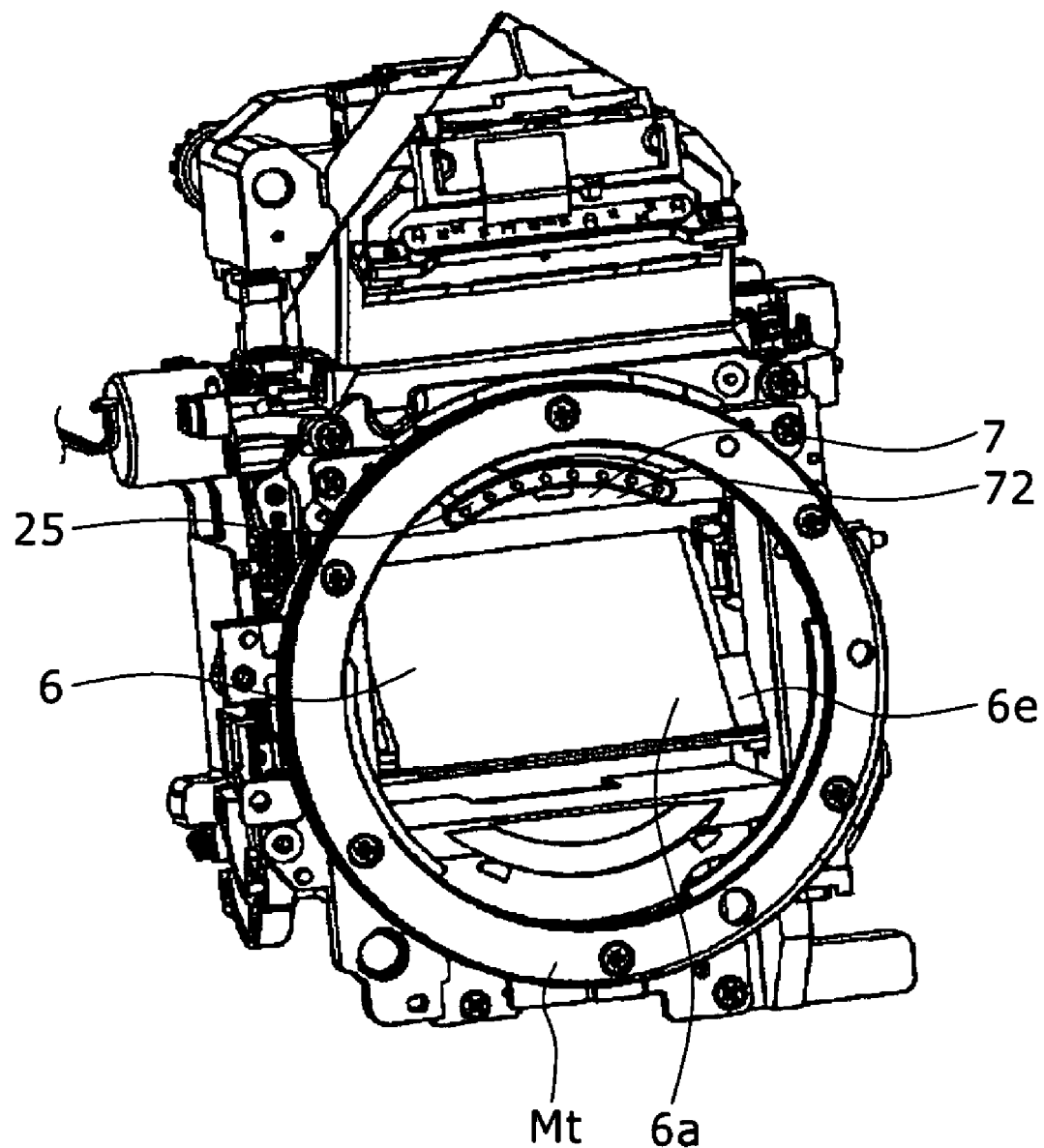
FIG. 2 is a perspective view showing the internal configuration of the imaging device.
Figure 3:
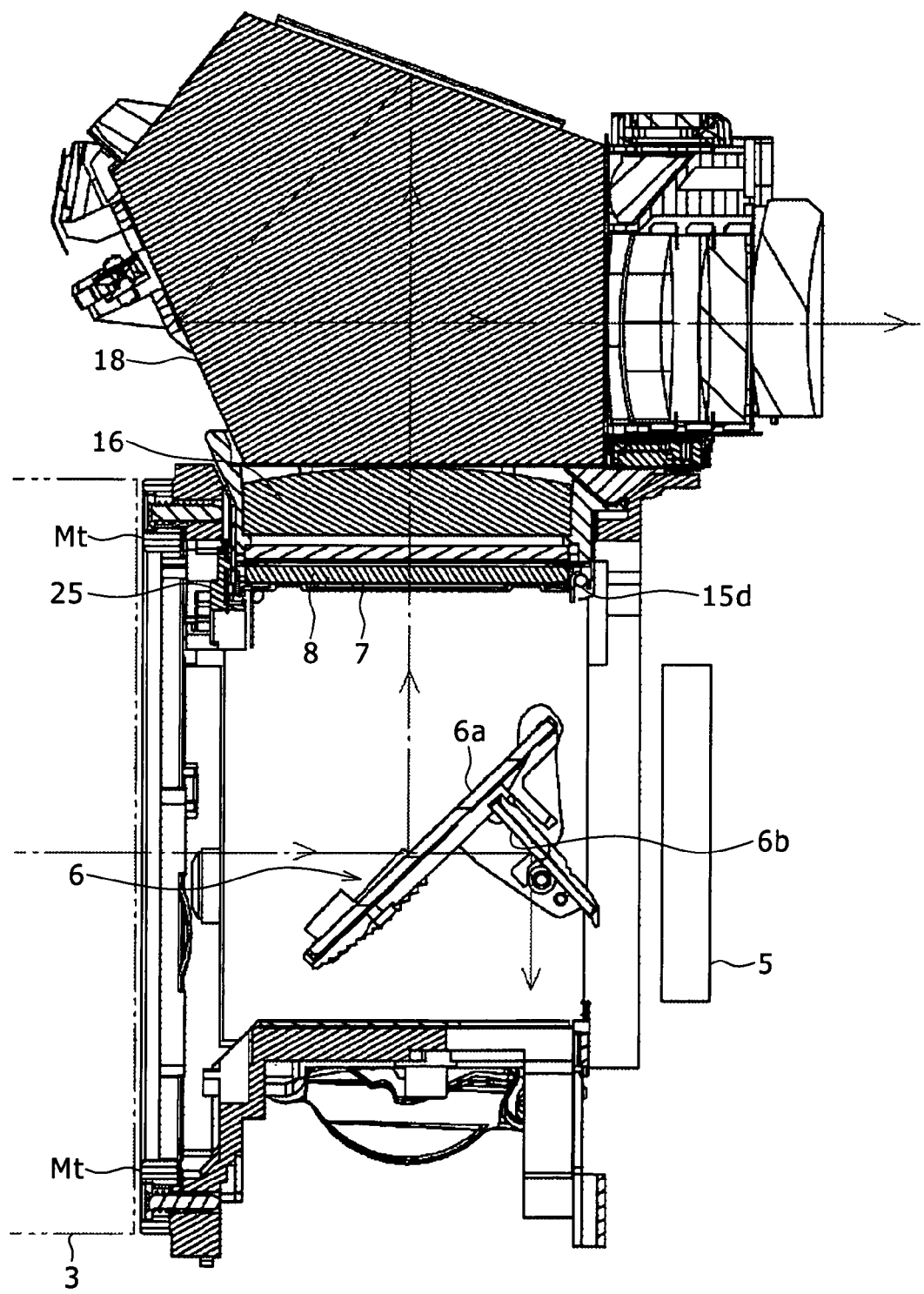
FIG. 3 is a sectional view showing the internal configuration of the imaging device.

FIG. 2 is a perspective view showing the internal configuration of the imaging device 1. FIG. 3 is a sectional view showing the internal configuration of the imaging device 1. FIGS. 2 and 3 show the mirror-down state.

As shown in FIG. 2, an electrical connection terminal 25 including a lens signal contact is provided at upper part of the inside of the lens mount part Mt. When the photographic lens unit 3 is mounted, various kinds of signals are sent and received via the lens signal contact.

Below the electrical connection terminal 25, a front side portion 72 (to be described later) of a focusing screen holding member 7 is provided. As described later, replacement operation of the focusing screen 8 is carried out through pressing of the front side portion 72 toward the backside, and so on.

As shown in FIG. 3, a mirror mechanism 6 is provided on the optical path (photographic optical path) from the photographic lens unit 3 to the imaging element 5. The mirror mechanism 6 has a main mirror 6a (main reflecting plane) for reflecting light from the photographic optical system toward the upper side. For example, part or all of the main mirror 6a is a half mirror and the main mirror 6a allows the passage of part of light from the photographic optical system therethrough. The mirror mechanism 6 also has a sub-mirror 6b (sub reflecting plane) for reflecting light that has passed through the main mirror 6a toward the lower side. The light reflected downward by the sub-mirror 6b is guided to and incident on an AF module (not shown) so as to be utilized for AF operation of a phase difference system. The replacement operation of the focusing screen is carried out in this "mirror-down state."

The mirror mechanism 6 is so disposed as to be in the mirror-down state (FIG. 3) until the shutter release button 21 is turned to the full-pushed state S2 (i.e. when the composition is being decided). In the mirror-down state, a subject image from the photographic lens unit 3 is reflected by the main mirror 6a and travels upward as a light beam for viewing. The subject image (optical image) reflected upward by the main mirror 6a is guided to the focusing screen 8 and formed on the focusing screen 8. Thereafter, the subject image that has passed through the focusing screen 8 is incident on a pentaprism 18 and further reflected by reflecting planes of the pentaprism 18. Then the subject image passes through an eyepiece and a finder window and reaches the eye of the photographer. Operation of deciding the composition by use of the optical view finder (OVF) is carried out in this state.

Thereafter, when the shutter release button 21 is turned to the full-pushed state S2, the mirror mechanism 6 is so driven as to become the mirror-up state and exposure operation is started. Specifically, the main mirror 6a and the sub-mirror 6b are flipped up upward so that light from the photographic optical system (subject image) may not be blocked. Thus, light from the photographic lens unit 3 travels without being reflected by the main mirror 6a and reaches the imaging element 5 in synchronization with the shutter-opened period. The imaging element 5 generates the image signal of the subject by photoelectric conversion based on the received light beam. In this manner, the light beam from the subject (subject image) passes through the photographic lens unit 3 and is guided to the imaging element 5, and thereby the photographed image (photographed image data) relating to the subject is acquired.

The imaging element (in this embodiment, a CCD sensor (referred to also as a CCD simply)) 5 is a light receiving element that converts the optical image of a subject (subject image) from the photographic lens unit 3 to an electric signal by photoelectric conversion effect. The imaging element 5 generates and acquires the image signal relating to the actual photographed image (image signal to be recorded). Specifically, the imaging element carries out exposure of a subject image formed on the light receiving plane (charge accumulation by photoelectric conversion) to thereby generate the image signal relating to the subject image.

Furthermore, predetermined analog signal processing is executed by a signal processor for the image signal acquired by the imaging element 5. Thereafter, the image signal resulting from the analog signal processing is converted to digital image data (image data) by an A/D conversion circuit and input to a digital signal processing circuit. The digital signal processing circuit executes various kinds of digital signal processing (black level correction processing, white balance (WB) processing, γ correction processing, and so on) for the digital image data. Thereby, image data relating to the actual photographed image is produced and the produced image data is recorded in a memory card.

<1-2. Configuration Around Focusing Screen>

Figure 4:
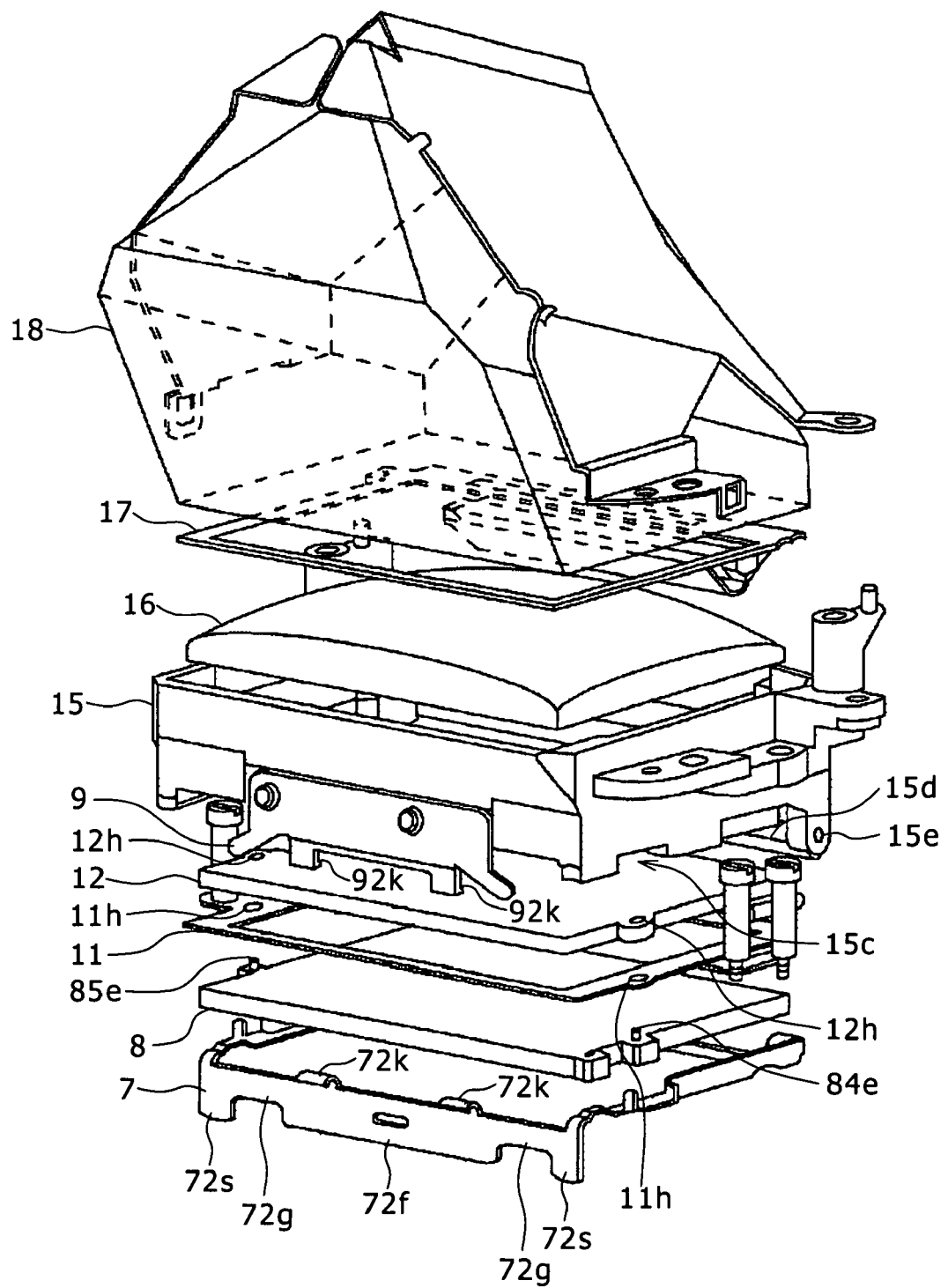
FIG. 4 is an exploded perspective view showing the configuration around a focusing screen.

FIG. 4 is an exploded perspective view showing the configuration around the focusing screen 8.

As shown in FIG. 4, along the upward direction, the focusing screen holding member (referred to also as a focusing screen holder) 7, the focusing screen 8, a visual field frame member 11, an SI screen 12, a pentaprism holder 15, a condenser lens 16, a pentaprism mask plate 17, and the pentaprism 18 are stacked in that order. A locking member 9 is so provided as to be fixed on the pentaprism holder 15. The pentaprism holder 15 and so on is fixed to the camera main body 2. Therefore, it can also be said that the locking member 9 is so provided as to be fixed to the camera main body 2. These components (including the focusing screen holding member 7, the locking member 9, and so on) form a focusing screen replacement mechanism.

Each of the focusing screen holding member 7, the visual field frame member 11, and the pentaprism mask plate 17 is a frame component having a substantially rectangular shape. The pentaprism holder 15 is a component having a substantially rectangular column shape with a hollow. Each of these components 7, 11, 15, and 17 has a hollow at the center thereof.

A subject image that is reflected by the main mirror 6a disposed below the configuration shown in FIG. 4 and travels upward in FIG. 4 passes through the hollow of each of the components 7, 11, 15, and 17 and various kinds of optical parts including the focusing screen 8, the SI screen 12, the condenser lens 16, and the pentaprism 18. Then the subject image is reflected by the pentaprism 18 and travels toward the backside of the camera to reach the eye of a viewer.

Figure 5:
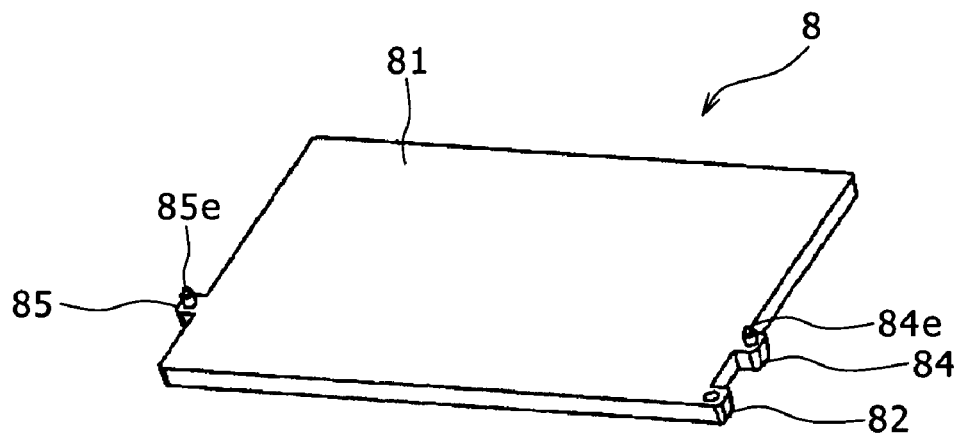
FIG. 5 is a perspective view showing the focusing screen.
Figure 6:
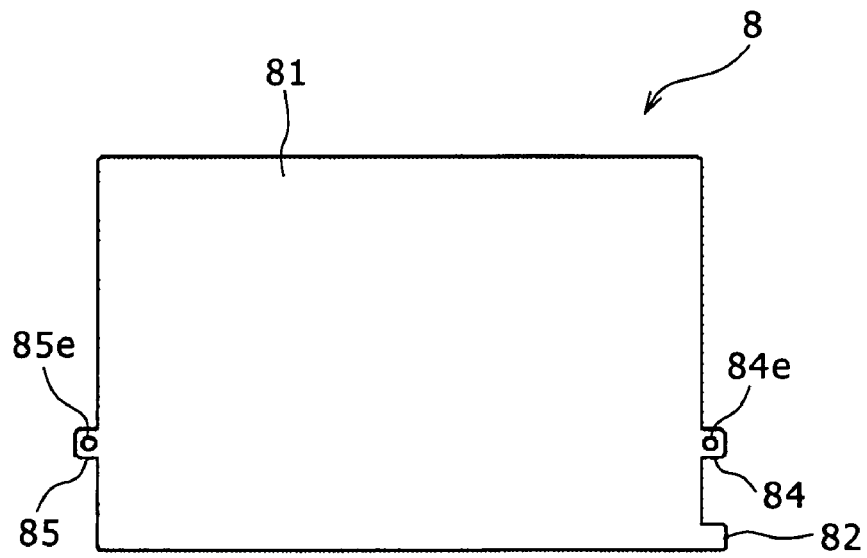
FIG. 6 is a top view of the focusing screen.
Figure 7:
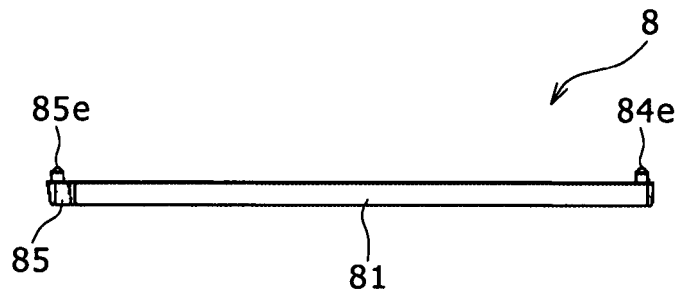
FIG. 7 is a front view of the focusing screen.
Figure 8:
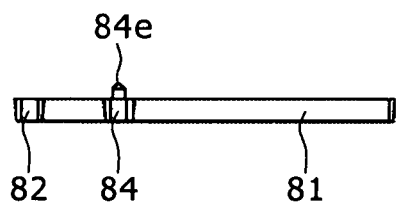
FIG. 8 is a side view of the focusing screen.

FIG. 5 is a perspective view showing the focusing screen 8. FIG. 6 is a top view of the focusing screen 8. FIG. 7 is a front view of the focusing screen 8. FIG. 8 is a side view (right side view) of the focusing screen 8.

The focusing screen 8 is an optical part having optical transparency. The focusing screen 8 has a Fresnel lens surface as its lower surface (light incidence surface) and has a mat surface as its upper surface (light output surface). The focusing screen 8 is a plate component having a substantially rectangular shape as shown in these diagrams. The focusing screen 8 has, on both the right and left sides of its main body 81, protrusions 82, 84, and 85 protruding from the main body 81 toward the outside. The protrusions 84 and 85 are provided at the right and left ends of the main body 81. As described later, the protrusions 84 and 85 come into contact with position restricting parts 74e and 75e of the focusing screen holding member 7 to thereby be utilized for operation of positioning the focusing screen 8. Projections 84e and 85e projecting upward are provided on the protrusions 84 and 85, respectively. The protrusion 82 is a part that is grasped by a jig for replacement of the focusing screen 8 as described later. That is, the protrusion 82 is used as a part that is grasped at the time of replacement of the focusing screen 8.

Figure 9:
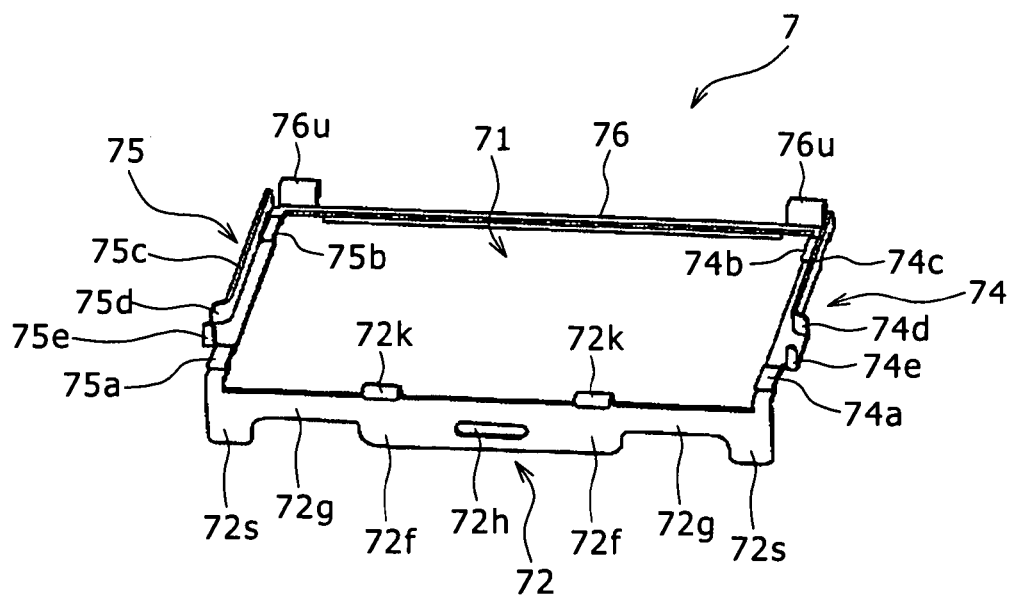
FIG. 9 is a perspective view showing a focusing screen holding member.
Figure 10:
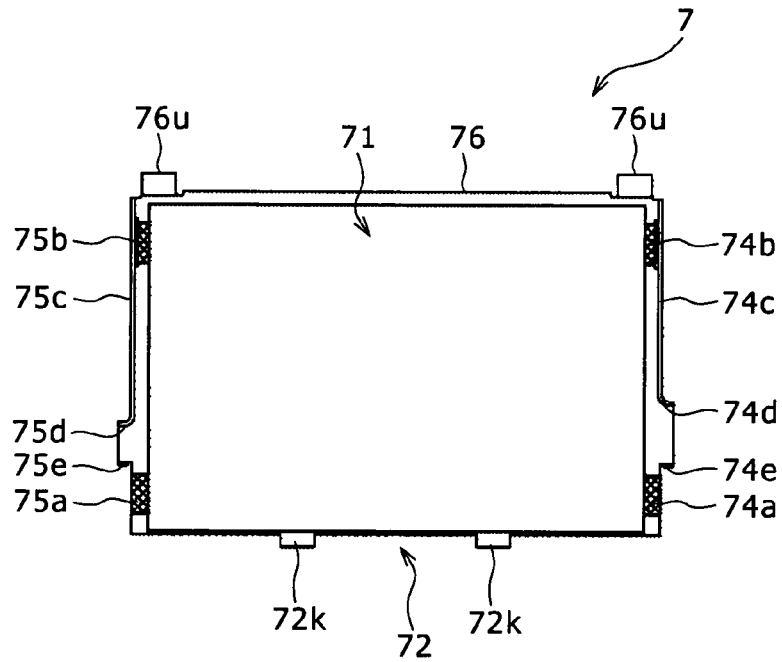
FIG. 10 is a top view of the focusing screen holding member.
Figure 11:
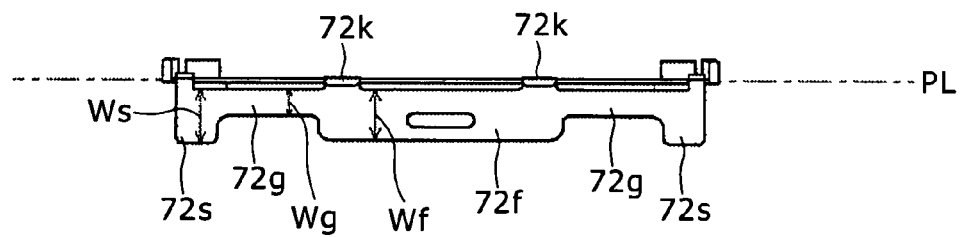
FIG. 11 is a front view of the focusing screen holding member.
Figure 12:
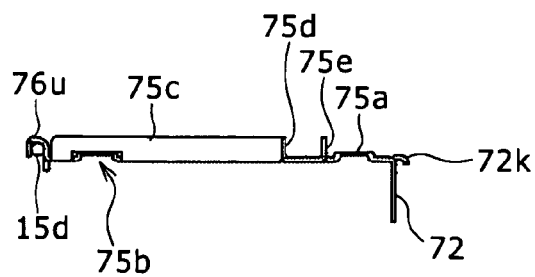
FIG. 12 is a left side view of the focusing screen holding member.
Figure 13:
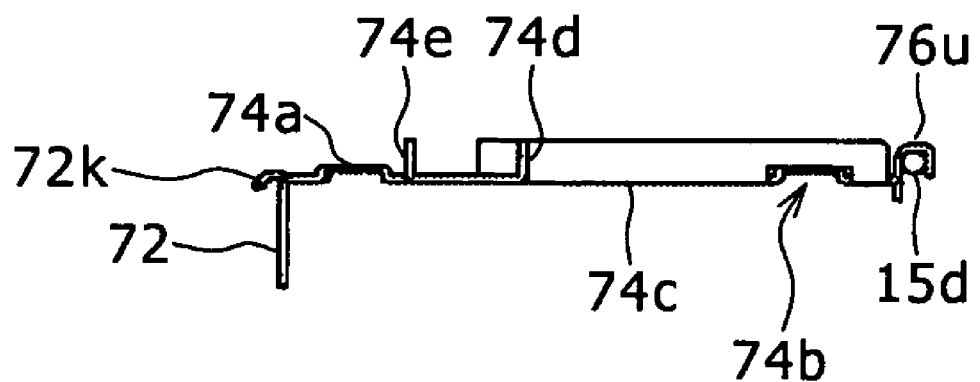
FIG. 13 is a right side view of the focusing screen holding member.

FIG. 9 is a perspective view showing the focusing screen holding member 7. FIG. 10 is a top view of the focusing screen holding member 7. FIG. 11 is a front view of the focusing screen holding member 7. FIG. 12 is a left side view of the focusing screen holding member 7. FIG. 13 is a right side view of the focusing screen holding member 7.

The focusing screen holding member 7 is a frame component having a hollow 71 as shown in these diagrams. The focusing screen holding member 7 has four frame portions having a substantially straight line shape: a front side portion 72 provided on the lens mount part side (front side), a backside portion 76 provided on the device backside, and connecting portions 74 and 75 interconnecting both the portions 72 and 76. These four straight line portions 72, 74, 76, and 75 are so disposed as to surround the hollow 71.

The focusing screen holding member 7 is composed of an elastic material such as a metal. For example, the focusing screen holding member 7 is formed from one sheet metal by press processing or the like. In other words, the above-described four straight line portions 72, 74, 75, and 76 are monolithically formed.

The front side portion 72 is a substantially plate component. Specifically, the front side portion 72 has a center part 72f at the center thereof and has deformation parts 72g on both sides (the outside) of the center part 72f. Furthermore, the front side portion 72 has stopper parts (referred to also as bump parts) 72s at its both ends (i.e. outside the deformation parts 72g). The front side portion 72 is bent substantially perpendicular to a focusing screen placement plane (the plane on which a focusing screen is placed) PL (see FIG. 11) and extends downward. Thus, the front side portion 72 is referred to also as a falling part. Therefore, all of the center part 72f, the deformation parts 72g, and the stopper parts 72s are formed as a plane substantially perpendicular to the focusing screen placement plane PL.

A hole 72h is provided at the center of the center part 72f, and engagement parts (referred to also as claw parts) 72k are provided at upper part of both sides of the hole 72h in the center part 72f. The right and left engagement parts 72k engage with right and left engagement parts (referred to also as claw parts) 92k of the locking member 9 (see FIG. 4, FIG. 16, and so on). This locks the focusing screen holding member 7.

The vertical width Wg of the deformation parts 72g (see FIG. 11) is smaller than the vertical width Wf of the center part 72f, and the rigidity of the deformation parts 72g is lower than that of the center part 72f. In other words, the vertical width Wf of the center part 72f is larger than the vertical width Wg of the deformation parts 72g, and the rigidity of the center part 72f is higher than that of the deformation parts 72g.

In this manner, the front side portion 72 has the center part 72f having comparatively high rigidity (referred to also as a high rigidity part) over a predetermined range including the engagement parts 72k along the longitudinal direction (lateral direction) of the front side portion 72. Furthermore, the front side portion 72 has the deformation part 72g having comparatively low rigidity (referred to also as a low rigidity part) on a side of (specifically, on both sides of) the center part 72f in the longitudinal direction. The rigidity of the deformation parts 72g is lower than that of the center part 72f, and elastic deformation occurs more easily in the deformation parts 72g than in the center part 72f.

As described later, when pressing force toward the backside is given to the center part 72f, elastic deformation occurs in the front side portion 72 (mainly in the deformation parts 72g) and the center part 72f moves toward the backside. At this time, the engagement parts 72k provided on the center part 72f are displaced toward the device backside, so that the locking by the engagement parts 72k and the engagement parts 92k is released. That is, the locked state of the focusing screen holding member 7 by the locking member 9 is released.

In particular, the rigidity of the center part 72f is comparatively high, and therefore the deformation of the center part 72f is comparatively small until pressing force larger than predetermined magnitude is given. Accordingly, the locked state of the focusing screen holding member 7 is rarely released with comparatively small force. In other words, it is possible to prevent the locked state from being easily released. The details of the operation of releasing the locking of the focusing screen holding member 7 and so on will be described later.

The vertical width Ws of the stopper parts 72s is larger than the vertical width Wg of the deformation parts 72g and larger than the vertical width Wf of the center part 72f.

One stopper part 72s is disposed at each of both lateral ends of the front side portion 72. The lateral interval between these two stopper parts 72s (specifically, the interval between the lower ends of both the stopper parts 72s) is equal to or larger than the width of the main mirror 6a. When the locking by the locking member 9 is released and the focusing screen holding member 7 is lowered toward the main mirror 6a as described later, both the stopper parts 72s abut against a mirror holding member 6e (to be described later) at such positions as to straddle the main mirror 6a. At this time, the stopper parts 72s are not in contact with the main mirror 6a itself. This can prevent damage to the main mirror 6a attributed to the contact between the main mirror 6a and the focusing screen holding member 7.

The connecting portion 74 extends from the front side portion 72 to the backside portion 76 at one lateral end side of the focusing screen holding member 7 (the right side in FIG. 9), and interconnects the front side portion 72 and the backside portion 76 along the forward/backward direction. The connecting portion 75 extends from the front side portion 72 to the backside portion 76 at the other lateral end side of the focusing screen holding member 7 (the left side in FIG. 9), and interconnects the front side portion 72 and the backside portion 76 along the forward/backward direction. The connecting portions 74 and 75 are disposed in substantially parallel to each other.

The connecting portion 74 has support parts 74a and 74b. As shown in FIG. 13, each of the support parts 74a and 74b is formed by bending part of the connecting portion 74 in such a way that part of the connecting portion 74 protrudes upward, and is given elasticity in the vertical direction. Similarly, the connecting portion 75 has support parts 75a and 75b as shown in FIG. 12. Each of the support parts 75a and 75b is formed by bending part of the connecting portion 75 in such a way that part of the connecting portion 75 protrudes upward, and is given elasticity in the vertical direction.

As described later, the focusing screen 8 is so supported as to be given upward pressing force by four support parts 74a, 74b, 75a, and 75b when being kept at the held state by the focusing screen holding member 7. Therefore, the support parts 74a, 74b, 75a, and 75b are referred to also as elastic force giving parts that give elastic force for pressing the focusing screen 8 against the camera main body side (specifically, toward the pentaprism holder 15 (i.e. upward)).

The connecting portions 74 and 75 also have the position restricting parts (guide parts) 74c, 74d, 74e, 75c, 75d, and 75e (see FIG. 9, FIG. 10, and so on).

Each of the position restricting parts (guide parts) 74c, 74d, 74e, 75c, 75d, and 75e is provided substantially upright from the focusing screen placement plane PL, and is utilized for positioning of the focusing screen 8. Specifically, when the focusing screen 8 is disposed on the focusing screen holding member 7, the position restricting parts 74c and 75c are disposed outside the focusing screen 8 in the lateral direction and restrict the movement of the focusing screen 8 in the lateral direction. Furthermore, the position restricting parts 74d and 74e are disposed on the front and rear sides of the protrusion 84 of the focusing screen 8 (see FIG. 5) and restrict the movement of the focusing screen 8 in the forward/backward direction. Similarly, the position restricting parts 75*d* and 75*e* are disposed on the front and rear sides of the protrusion 85 of the focusing screen 8 and restrict the movement of the focusing screen 8 in the forward/backward direction.

Strictly speaking, in this embodiment, when the focusing screen 8 moves toward the backside, hinge parts 76*u* (to be described later) get contact with the focusing screen 8 earlier than the position restricting part 74*d* and thereby restrict the movement of the focusing screen 8 toward the backside. Similarly, the hinge parts 76*u* (to be described later) get contact with the focusing screen 8 earlier than the position restricting part 75*d* and thereby restrict the movement of the focusing screen 8 toward the backside. Therefore, the position restricting parts 74*d* and 75*d* may be absent.

The backside portion 76 is disposed in substantially parallel to the front side portion 72.

The backside portion 76 has the hinge part 76*u* processed into an inverted-U character shape at each of both ends thereof. The hinge part 76*u* is supported by a rotation shaft 15*d* (see FIG. 16 and so on) and is provided rotatably about the rotation shaft 15*d*. This allows the focusing screen holding member 7 to rotate about the rotation shaft 15*d* (specifically, about the center axis of the rotation shaft 15*d*). The rotation shaft 15*d* is a shaft component that is fixed to attaching parts 15*e* at both lateral ends on the backside of the pentaprism holder 15 and extends along the lateral direction of the pentaprism holder 15 (see FIG. 3, FIG. 4, and so on).

The above-described focusing screen 8 is detachably held by this focusing screen holding member 7. Specifically, at an upper position (see FIG. 14) to be described later, the focusing screen holding member 7 holds the focusing screen 8 in cooperation with the pentaprism holder 15, the visual field frame member 11, and so on. At a lower position (see FIG. 15) to be described later, replacement operation (detachment operation and attachment operation) of the focusing screen 8 can be carried out.

For example, the focusing screen holding member 7 supports the focusing screen 8 (specifically, peripheral part of the bottom thereof) as the placement subject by four support parts (referred to also as elastic support parts) 74*a*, 74*b*, 75*a*, and 75*b* (see FIG. 9 and so on).

Furthermore, the right and left sides of the focusing screen 8 come into contact with the position restricting parts 74*c* and 75*c* of the focusing screen holding member 7. This restricts the position change of the focusing screen 8 in the lateral direction. In addition, the protrusion 84 of the focusing screen 8 is disposed between the position restricting part 74*d* and the position restricting part 74*e* along the forward/backward direction, and thus the position change of the focusing screen 8 in the forward/backward direction is restricted. Similarly, the protrusion 85 of the focusing screen 8 is disposed between the position restricting part 75*d* and the position restricting part 75*e* along the forward/backward direction, and thus the position change of the focusing screen 8 in the forward/backward direction is restricted. These features prevent the focusing screen 8 from moving to a large extent and allow the focusing screen 8 to be led to the appropriate position at the time of replacement of the focusing screen 8.

Moreover, the visual field frame member 11 is so fixed to the bottom of the pentaprism holder 15 that the top surface of the visual field frame member 11 is in contact with the frame part of the bottom of the pentaprism holder 15 (see FIG. 4). In addition, the SI screen 12 is held at the inside bottom of the pentaprism holder 15. Holes 12*h* are provided on both the right and left sides of peripheral part of the SI screen 12, and holes 11*h* are provided on both the right and left sides of the frame part of the visual field frame member 11. The holes 12*h* and the holes 11*h* are provided at positions corresponding to each other. The holes 12*h* of the SI screen 12 are disposed in recesses 15*c* of the pentaprism holder 15.

When the focusing screen holding member 7 is moved to the upper position (see FIG. 14) after replacement of the focusing screen 8, the projection 84*e* (projecting upward from the protrusion 84 of the focusing screen 8) penetrates the hole 11*h* and is fit into the hole 12*h* (in a loose fit state). Similarly, the projection 85*e* (projecting upward from the protrusion 85 of the focusing screen 8) penetrates the hole 11*h* and is fit into the hole 12*h* (in a loose fit state). In this way, the focusing screen 8 is held by the focusing screen holding member 7 and so on in such a manner as to be accurately aligned with the pentaprism holder 15.

When the focusing screen holding member 7 is locked by the locking member 9 (see FIG. 16), the held state of the focusing screen 8 by the focusing screen holding member 7 is maintained. In this state, the focusing screen 8 disposed at the proper position is so held as to be pressed toward the pentaprism holder 15 (upward) by elastic force of four support parts 74*a*, 74*b*, 75*a*, and 75*b* (see FIG. 9 and so on). In this manner, the focusing screen holding member 7 can surely hold the focusing screen 8.

<1-3. Replacement Operation of Focusing Screen>

The details of the replacement operation of the focusing screen will be described below.

Figure 14:
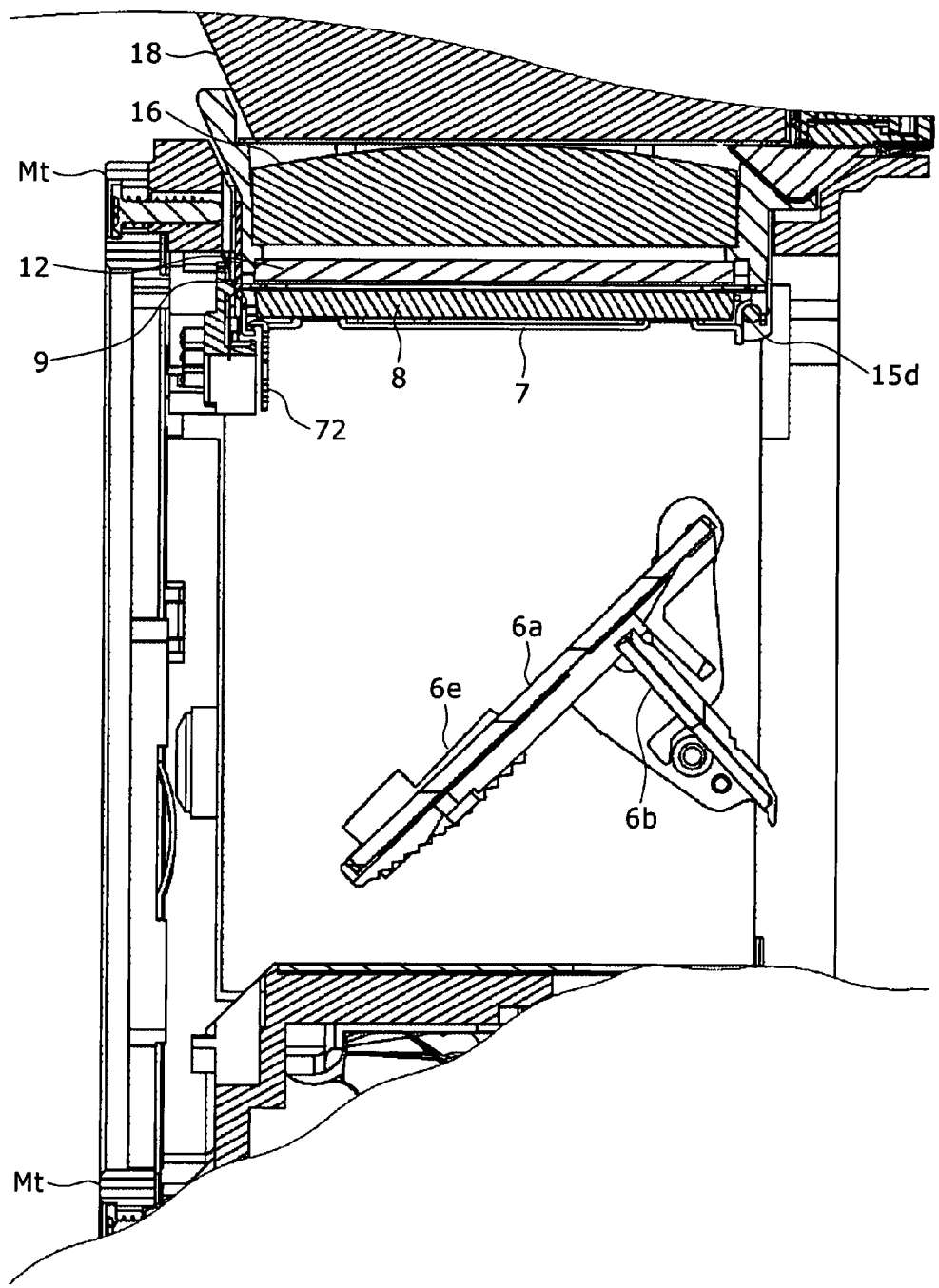
FIG. 14 is a sectional view showing the state in which the focusing screen holding member exists at an upper position.
Figure 15:
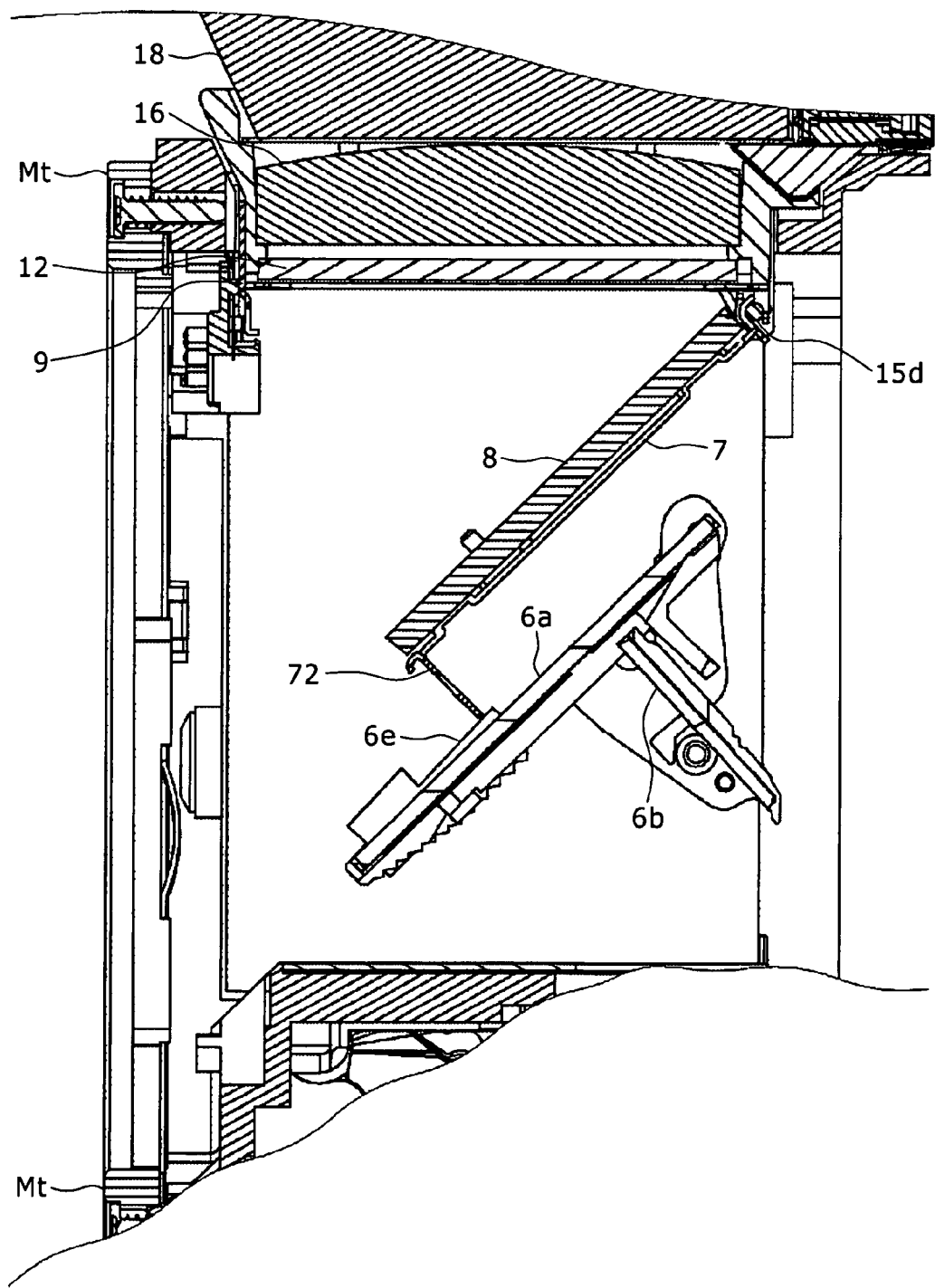
FIG. 15 is a sectional view showing the state in which the focusing screen holding member exists at a lower position.
Figure 16:
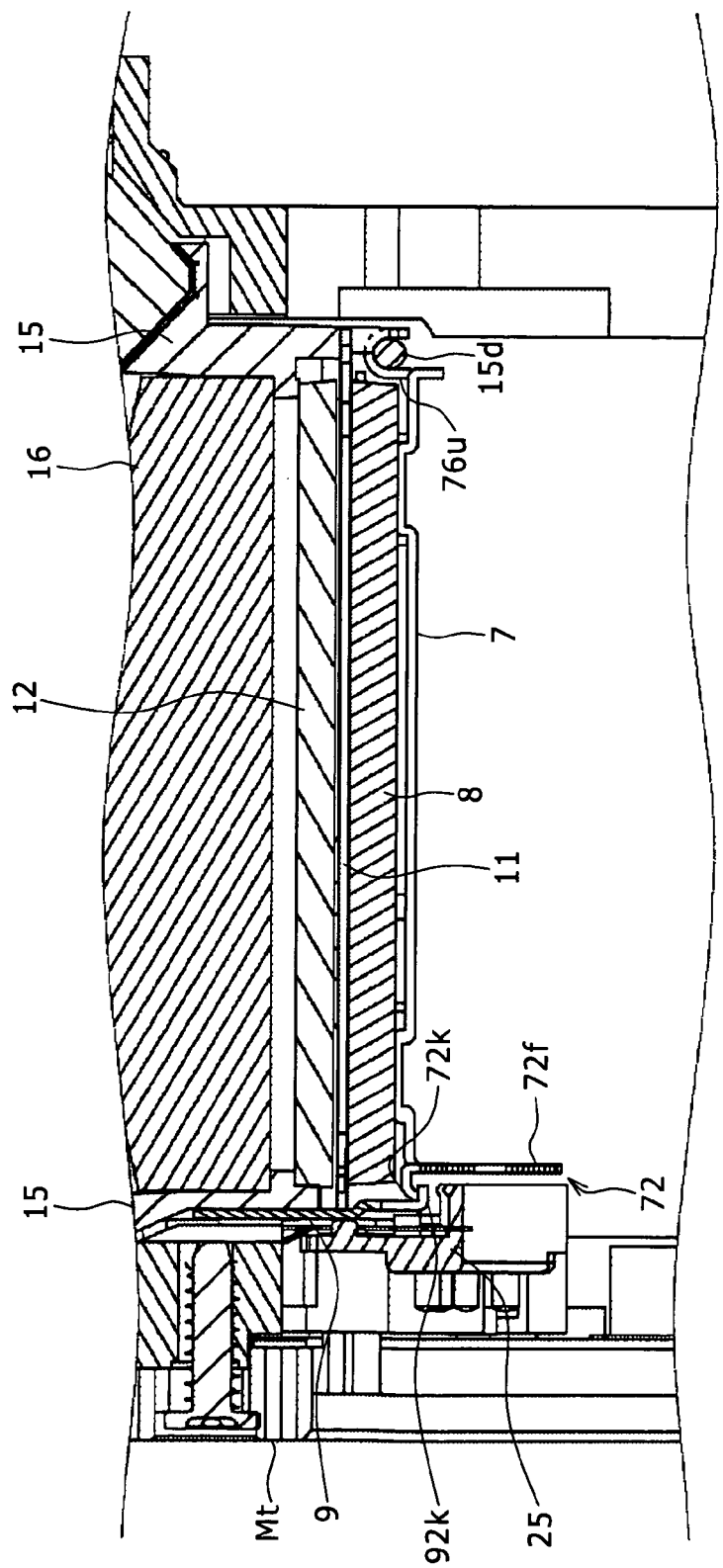
FIG. 16 is a partially enlarged view of FIG. 14.
Figure 17:
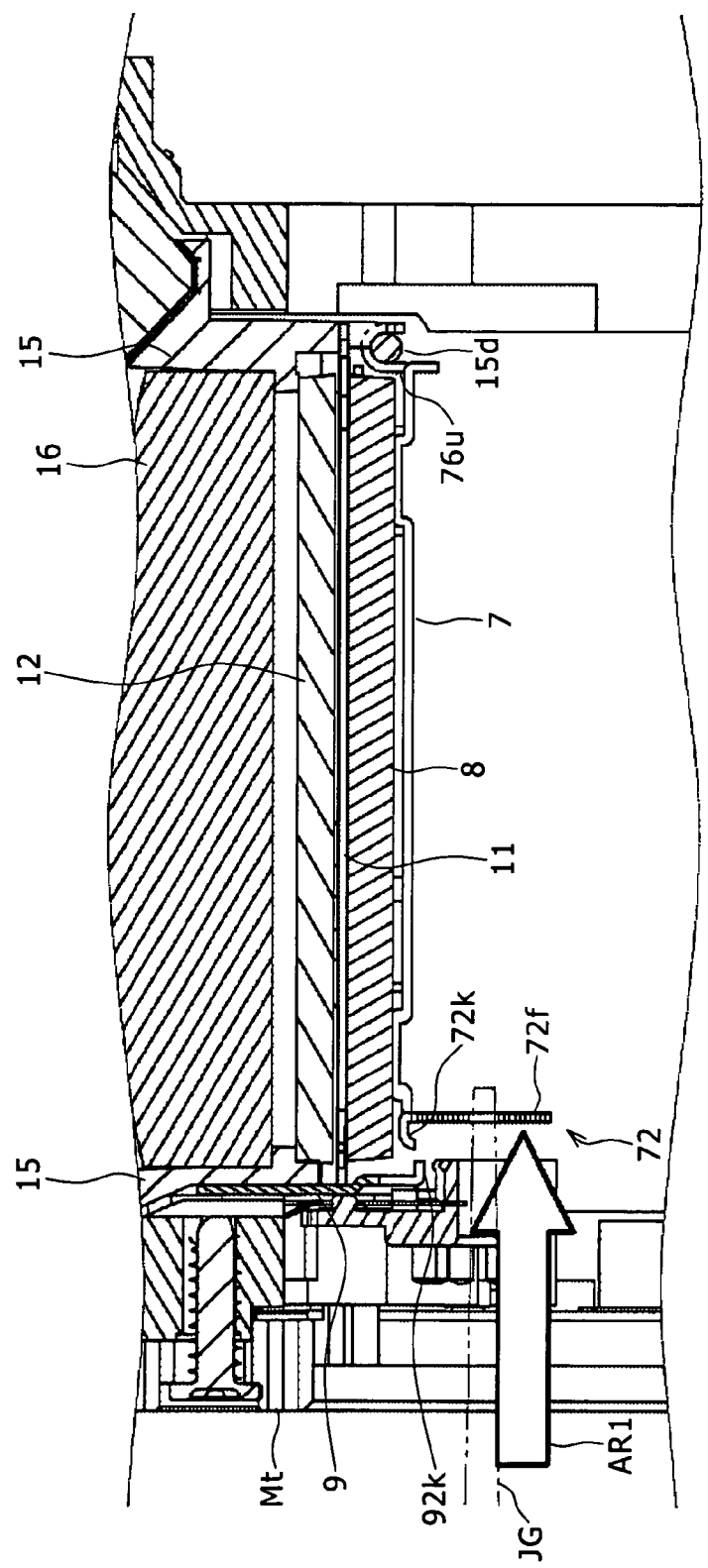
FIG. 17 is a diagram showing the state in which a front side portion is being pressed toward the device backside.
Figure 18:
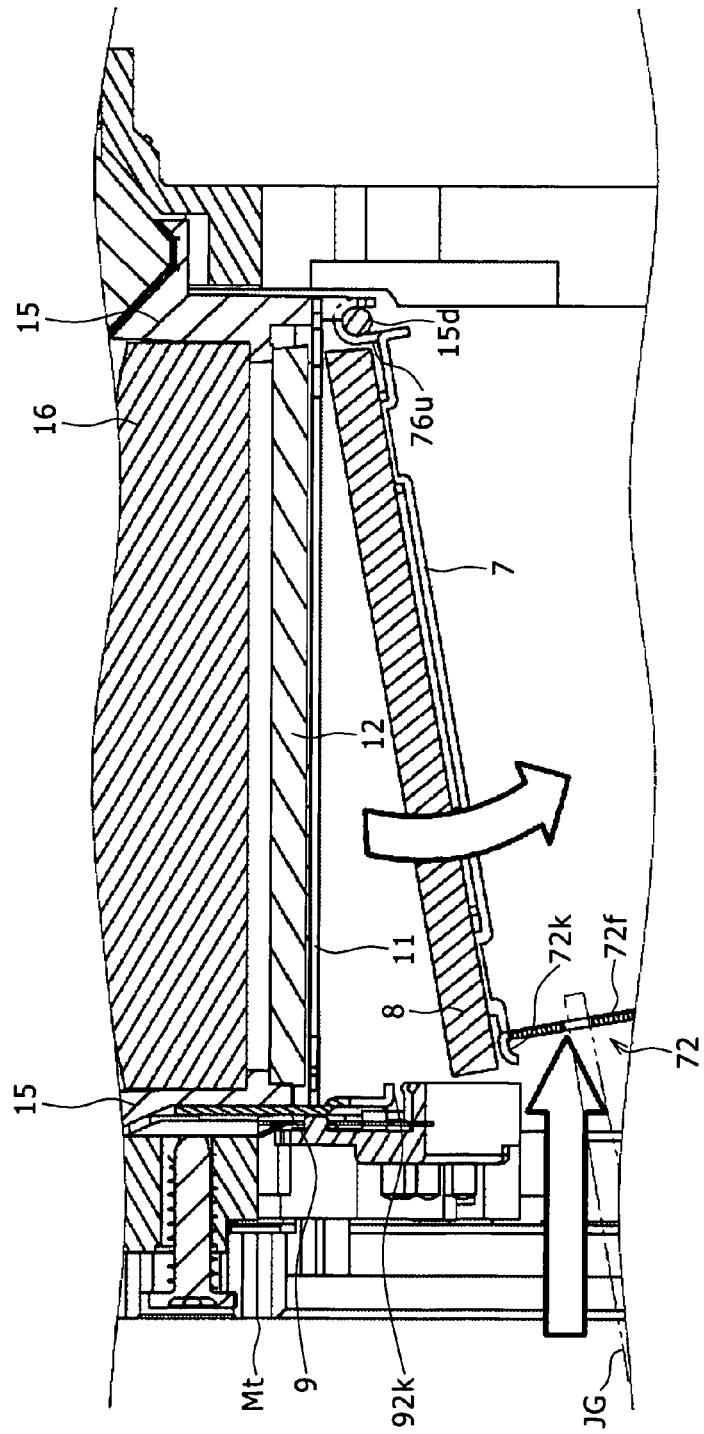
FIG. 18 is a diagram showing how the focusing screen holding member rotates anticlockwise.
Figure 19:
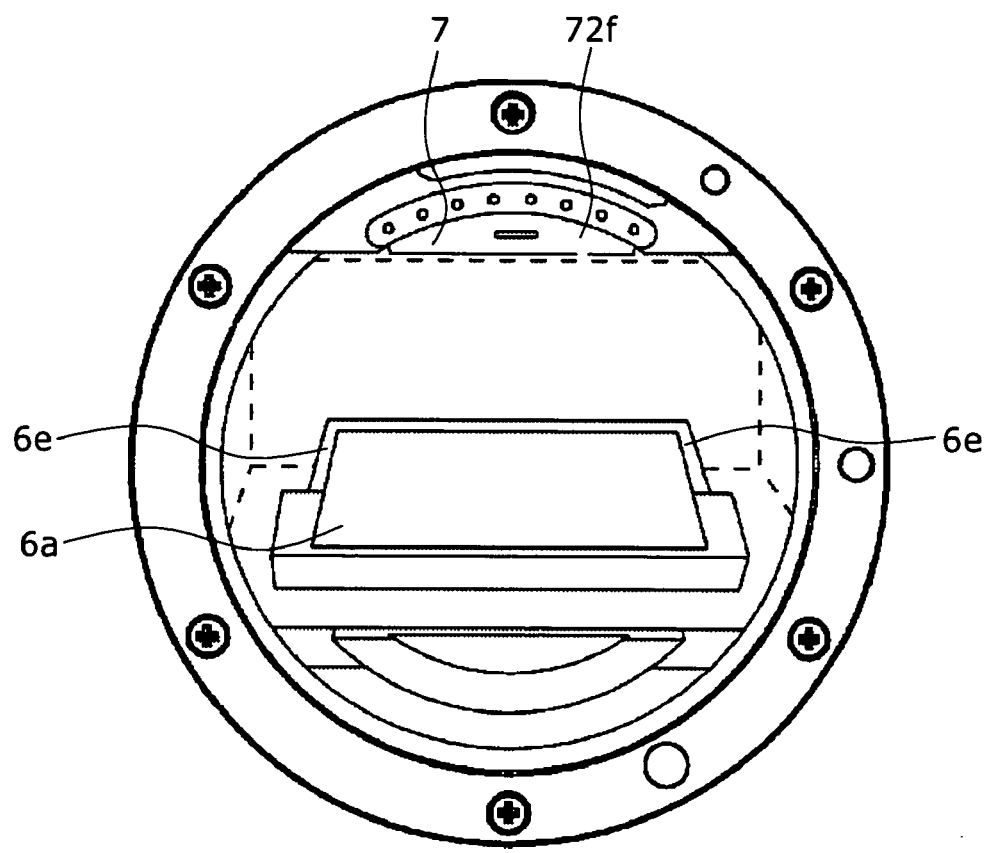
FIG. 19 is a diagram showing the inside of the opening inside a lens mount part (corresponding to FIG. 14)
Figure 20:
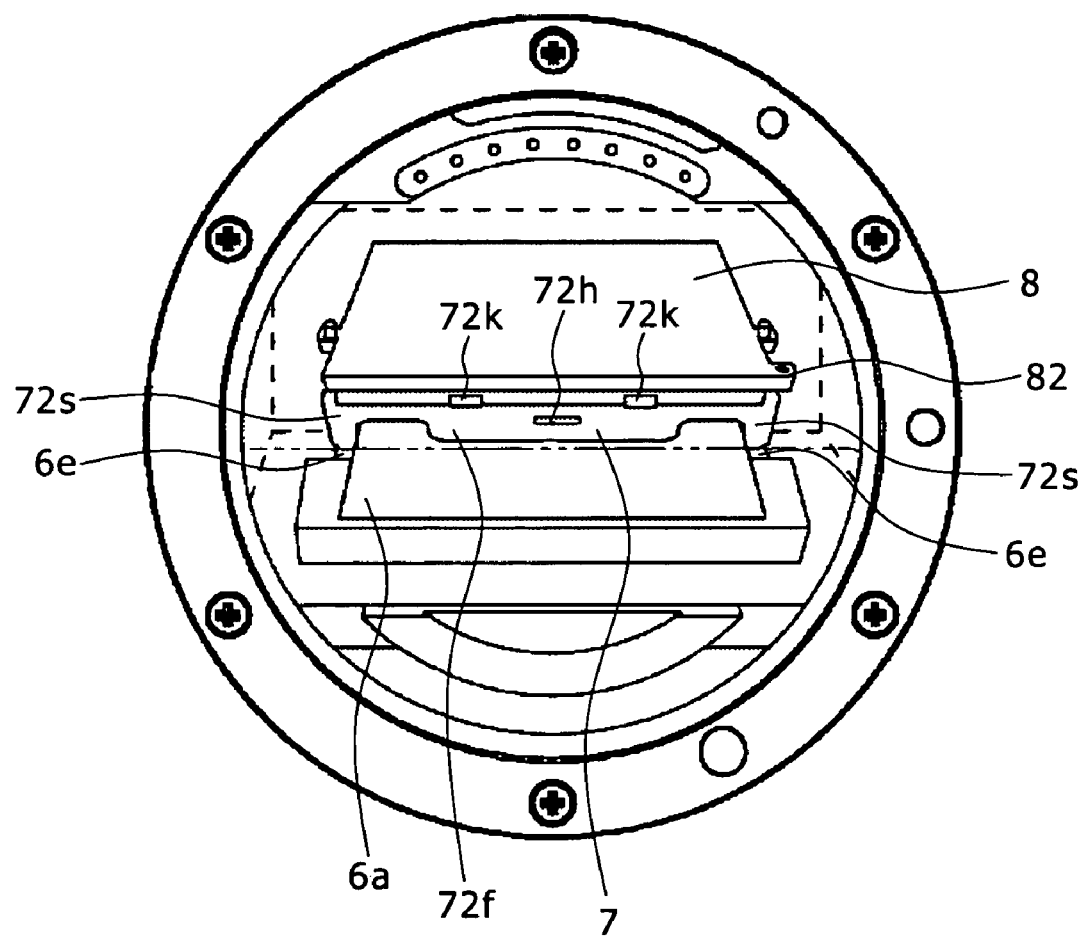
FIG. 20 is a diagram showing the inside of the opening inside the lens mount part (corresponding to FIG. 15)

FIG. 14 is a sectional view showing the state in which the focusing screen holding member 7 exists at the upper position. FIG. 15 is a sectional view showing the state in which the focusing screen holding member 7 exists at the lower position. FIGS. 16 to 18 are sectional views showing the details of the operation until the focusing screen holding member 7 is shifted from the upper position (FIG. 14) to the lower position (FIG. 15). FIGS. 19 and 20 are diagrams showing the state inside the camera main body 2, viewed through the opening inside the lens mount part (lens attachment part) Mt of the camera main body 2. FIG. 19 corresponds to the state in which the focusing screen holding member 7 exists at the upper position. FIG. 20 corresponds to the state in which the focusing screen holding member 7 exists at the lower position. Note that each of FIGS. 19 and 20 is a perspective view obtained when the inside is seen from a somewhat lower side.

The following description will deal with operation of replacing the focusing screen 8 in the state in which the photographic lens unit 3 is removed from the camera main body 2 by a user as shown in FIG. 19.

Operation for detaching the focusing screen 8 will be described first.

To release the held state of the focusing screen 8 by the focusing screen holding member 7, the user presses the front side portion 72 (specifically, the center part 72*f*) at upper part of the inside of the lens mount part Mt toward the backside by using the tip of a jig (e.g. a tweezers-type jig) JG for focusing screen replacement. That is, the user gives pressing force toward the device backside to the front side portion 72. In other words, the user gives the front side portion 72 pressing force in such a direction as to separate the front side portion 72 from the locking member 9 (the direction indicated by arrowhead AR1 (FIG. 17)). In the present example, the user gives the pressing force toward the backside to the front side portion 72 in such a manner as to insert the tip of the jig JG into the hole 72*h* so that lowering operation to be described later may also be smoothly carried out.

FIG. 16 shows the state before the pressing force is given, and FIG. 17 shows the state immediately after the pressing force is given.

As shown in FIG. 16, before the pressing force is given, the engagement parts 72k provided on the front side portion 72 of the focusing screen holding member 7 engage with the engagement parts 92k of the locking member 9. This locks the focusing screen holding member 7 so that the rotational operation of the focusing screen holding member 7 about the rotation shaft 15d may be inhibited. In this locked state, the held state of the focusing screen 8 by the focusing screen holding member 7 is maintained. The locking member 9 is provided between the lens mount part Mt and the front side portion 72 of the focusing screen holding member 7. Furthermore, the locking member 9 has a substantially plate shape and has one engagement part 92k on each of both the right and left sides of the lower end, i.e. total two engagement parts 92k (see FIG. 4). These engagement parts 92k are formed by bending lower end part of the locking member 9 toward the backside.

As is apparent from comparison between FIG. 16 and FIG. 17, when the center part 72f of the front side portion 72 is pressed by the user and thereby pressing force toward the backside (the right side in the diagrams) is given to the center part 72f, elastic deformation occurs in the front side portion 72 (specifically, the center part 72f, the deformation parts 72g, and so on). However, the elastic deformation occurs mainly in the deformation parts 72g (see FIG. 9) because the rigidity (in other words, the elasticity) is different between the center part 72f and the deformation parts 72g as described above. Furthermore, the center part 72f moves toward the backside (in the direction of arrowhead AR1) and the engagement parts 72k (FIG. 9) existing near the center part 72f also move toward the backside.

At this time, the engagement between the engagement parts 72k and the engagement parts 92k is released and thus the locked state of the focusing screen holding member 7 by the locking member 9 is released as shown in FIG. 17. This makes it possible that the focusing screen holding member 7 rotates about the rotation shaft 15d.

Thereafter, the user moves the tip of the jig JG inserted into the hole 72h downward. In linkage with this operation, the focusing screen holding member 7 is rotated anticlockwise about the rotation shaft 15d (specifically, the center axis thereof) as shown in FIG. 18. The focusing screen 8 disposed on the focusing screen holding member 7 is also moved together with the focusing screen holding member 7. The protrusion 84 of the focusing screen 8 exists between the position restricting part 74d and the position restricting part 74e of the focusing screen holding member 7. The protrusion 85 of the focusing screen 8 exists between the position restricting part 75d and the position restricting part 75e of the focusing screen holding member 7. In this lowering operation, the position of the focusing screen 8 in the forward/backward direction is restricted particularly by the position restricting parts 74e and 75e (FIG. 9), which are on the comparatively front side.

When the focusing screen holding member 7 is rotated about the rotation shaft 15d by a predetermined amount (e.g. about 45°), the stopper parts 72s of the front side portion 72 abut against the mirror holding member 6e, so that the rotational operation is stopped. This state (see FIG. 15) can be represented also as a replacement-possible state in which the focusing screen 8 can be replaced. The mirror holding member 6e is a component for holding the main mirror 6a and is disposed on both side parts of the main mirror 6a having a substantially rectangular shape in the lateral direction.

When the locking of the focusing screen holding member 7 by the locking member 9 is thus released, the focusing screen holding member 7 rotates about the rotation shaft 15d and is shifted to the replacement-possible state (FIG. 15).

In this replacement-possible state, the focusing screen holding member 7 is supported by the main mirror 6a in such a way that the contact between the main mirror 6a and all of the stopper parts 72s, the deformation parts 72g, and the center part 72f is avoided and the stopper parts 72s abut against the mirror holding member 6e (see FIG. 20).

In the present example, the vertical width Ws of the stopper parts 72s is larger than both the width Wg of the deformation parts 72g and the width Wf of the center part 72f. In addition, the mirror holding member 6e exists at a position higher in the thickness direction of the main mirror 6a (closer to the focusing screen holding member 7) than the mirror plane (reflecting plane) of the main mirror 6a. Due to this condition, the contact between the main mirror 6a and all of the stopper parts 72s, the deformation parts 72g, and the center part 72f is avoided.

In the state of FIG. 15 and FIG. 20, the user removes the tip of the jig JG from the hole 72h, and then brings out the focusing screen 8 by grasping the protrusion 82 by use of the grasping mechanism of the jig JG. As shown in FIG. 20, the protrusion 82 exists on the front right side inside the lens mount part Mt.

By this operation, the focusing screen 8 as the replacement target (the focusing screen disposed before the replacement) is brought to the outside of the camera main body 2.

Operation of attaching the focusing screen 8 to be used after the replacement will be described below.

In the state of FIG. 15 and FIG. 20, the user grasps the protrusion (grasped part) 82 of the new focusing screen 8 to be used after the replacement by using the tip grasping part of the jig JG and disposes the focusing screen 8 at a predetermined position on the focusing screen holding member 7. Thereafter, the user separates the jig JG from the focusing screen 8. Subsequently, the user inserts the jig JG into the hole 72h and moves the focusing screen holding member 7 to the upper position. Specifically, the user rotates the front side portion 72 (the focusing screen holding member 7) upward (in the clockwise direction in FIG. 21) about the rotation shaft 15d by using the jig JG. At this time, it is preferable for the user to give only force for moving the front side portion 72 upward without applying pressing force toward the backside to the front side portion 72.

Figure 21:
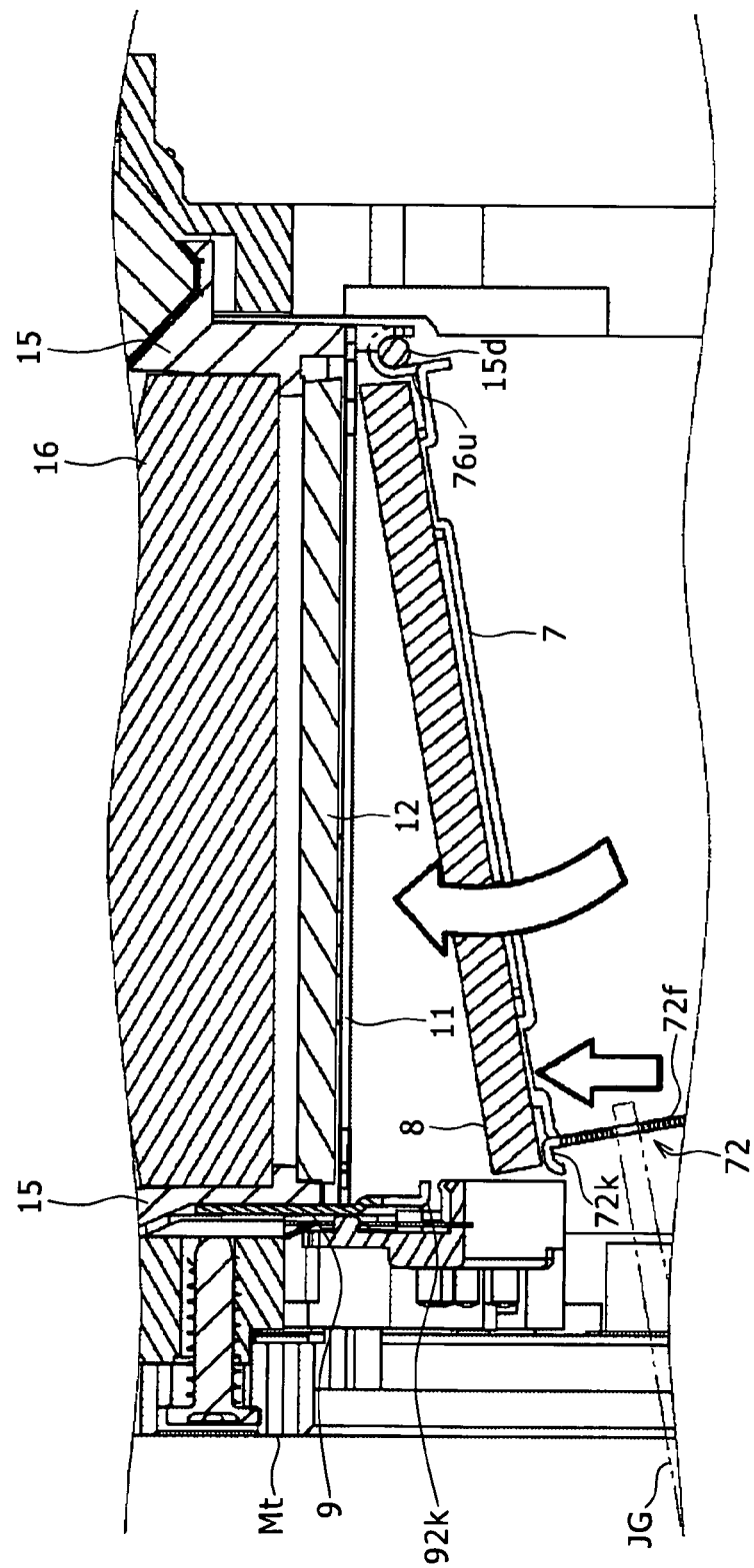
FIG. 21 is a diagram showing how the focusing screen holding member rotates clockwise.

As shown in FIG. 21, the focusing screen 8 is moved upward together with the focusing screen holding member 7 in linkage with this movement operation.

Figure 22:
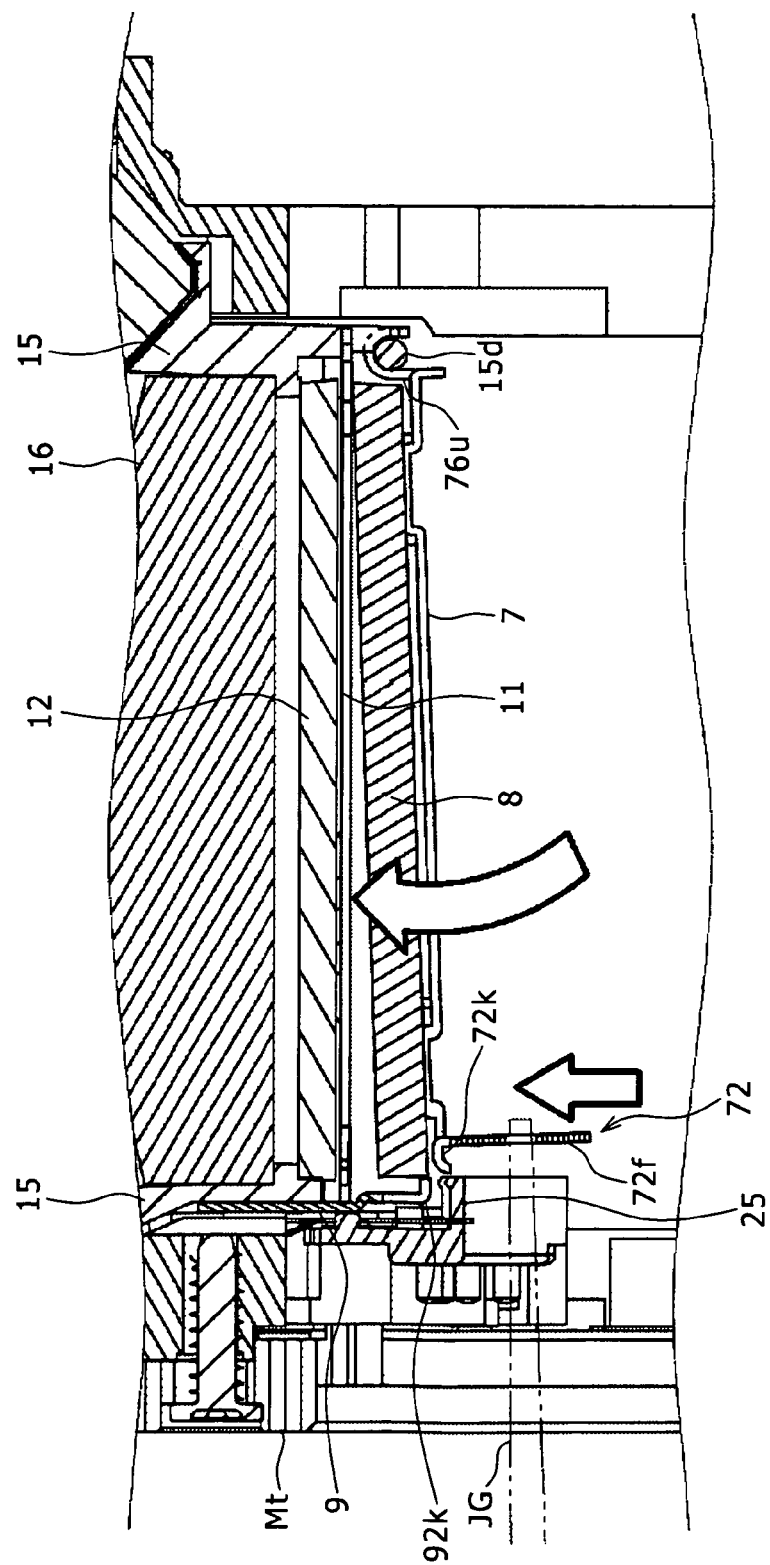
FIG. 22 is a diagram showing how the focusing screen holding member rotates clockwise.

As shown in FIG. 22, when the focusing screen holding member 7 is further moved upward, the engagement parts 72k move upward with contact with a backside resin part (insulating part) of the electrical connection terminal 25.

Figure 23:
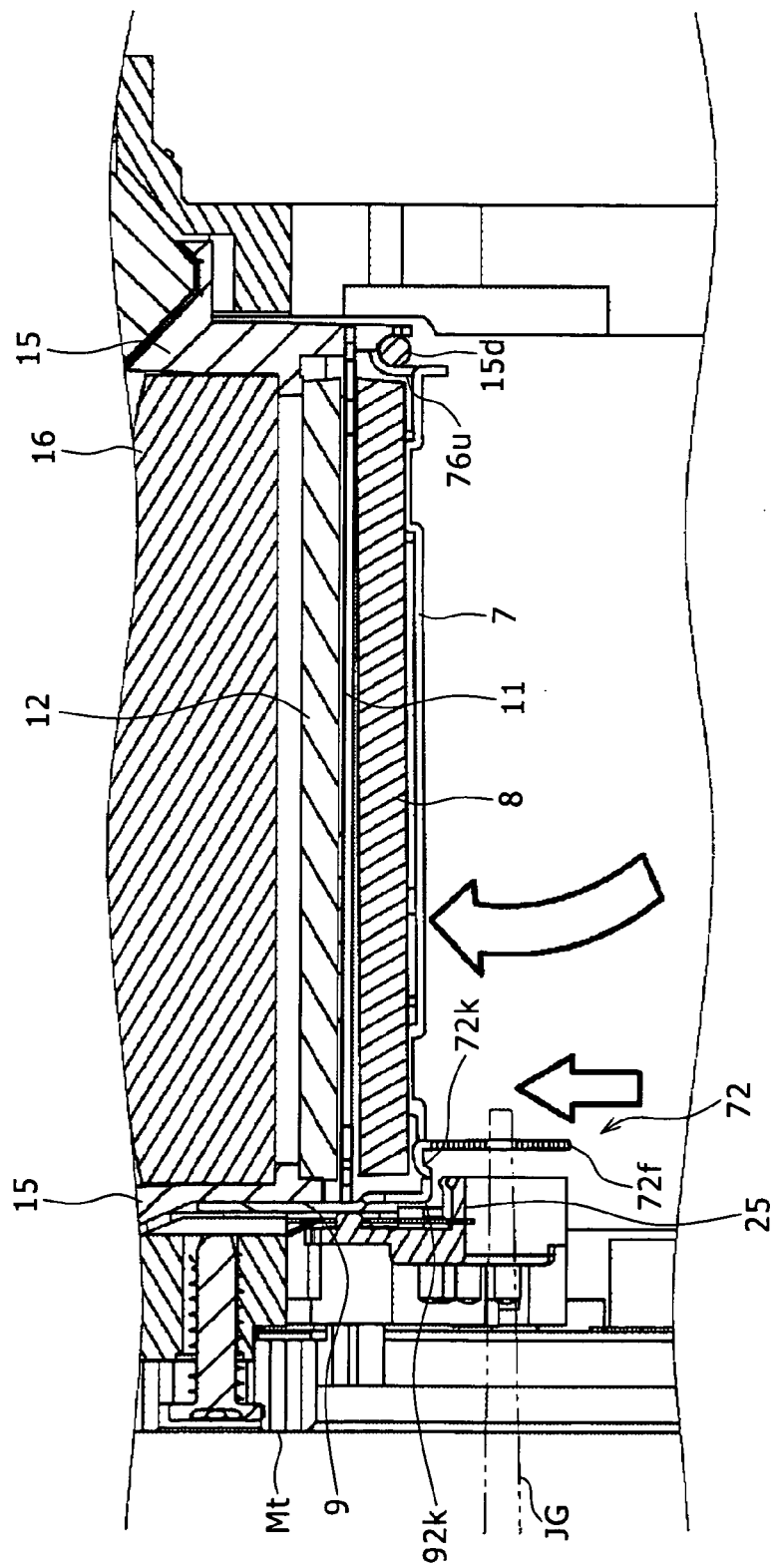
FIG. 23 is a diagram showing how the focusing screen holding member rotates clockwise.

Furthermore, as shown in FIG. 23, when the focusing screen holding member 7 is further moved upward, the engagement parts 72k move upward with contact with the engagement parts 92k.

In response to this contact operation, the front side portion 72 of the focusing screen holding member 7 is further moved upward in such a manner as to be slightly moved toward the backside due to reception of pressing force from the engagement parts 92k. Subsequently, upon the passage of the tips of the engagement parts 72k across the tips of the engagement parts 92k, the reaction force from the engagement parts 92k becomes smaller and the front side portion 72 moves toward the front side (the left side in the diagram), so that the engagement between the engagement parts 72k and the engagement parts 92k is achieved again (see FIG. 16). In other words, the focusing screen holding member 7 is locked by the locking member 9. Thus, the held state by the focusing screen holding member 7 is achieved again.

Figure 26:
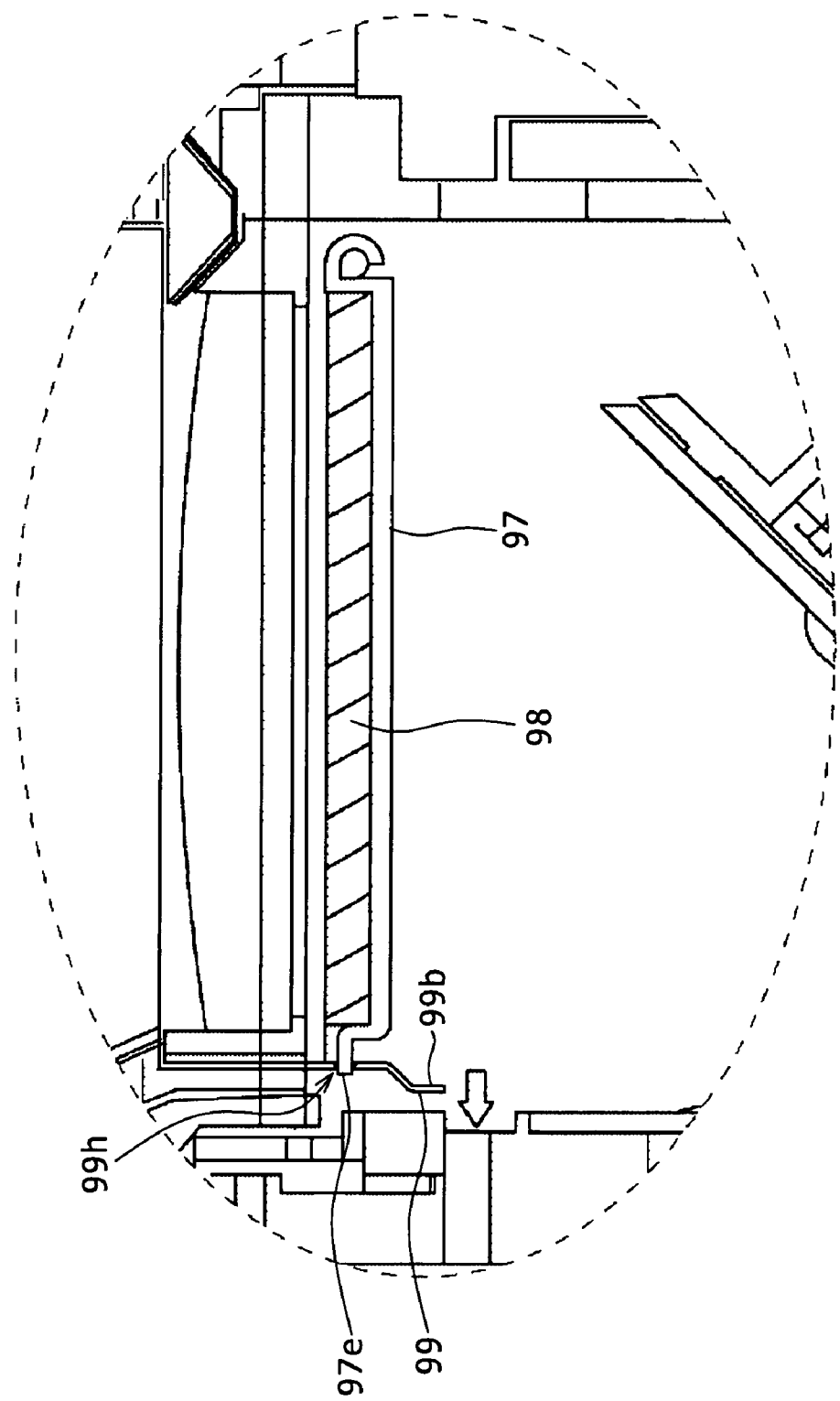
FIG. 26 is a diagram showing a focusing screen replacement mechanism according to a related art.

As described above, due to the application of pressing force toward the device backside to the front side portion 72 by the user, the engagement parts 72$k$ of the front side portion 72 are displaced toward the device backside and the engagement between the engagement parts 72$k$ and the engagement parts 92$k$ of the locking member 9 is released (see FIG. 16 and FIG. 17). As a result, the locked state of the focusing screen holding member 7 by the locking member 9 is released. Therefore, unlike the above-described related art (see FIG. 26), the space for pulling the locking member (99) toward the front side (device front side) does not need to be provided in front of the locking member. In other words, there is no need to ensure the space for allowing the locking member 9 to move forward on the front side (device front side) of the locking member 9. Therefore, it is possible that, as shown in FIG. 16 for example, the front side portion of the focusing screen holding member 7 is disposed very close to the electrical connection terminal 25 and the locking member 9 is disposed comparatively close to the lens mount part Mt. Space saving can be achieved in this manner. Therefore, size reduction of the imaging device 1 can be achieved.

2. Second Embodiment

In the above-described first embodiment, when the focusing screen 8 is in the held state, the engagement parts 92$k$ of the locking member 9 and the engagement parts 72$k$ of the focusing screen holding member 7 engage with each other in such a way that they (particularly the engagement parts 92$k$) extend along the substantially horizontal direction (see FIG. 16). However, the present invention is not limited thereto. For example, the engagement parts 92$k$ of the locking member 9 and the engagement parts 72$k$ of the focusing screen holding member 7 may engage with each other in such a manner as to extend obliquely to the horizontal direction. Such a modification example will be described below as a second embodiment of the present invention. The following description will mainly deal with differences from the first embodiment.

Figure 24:
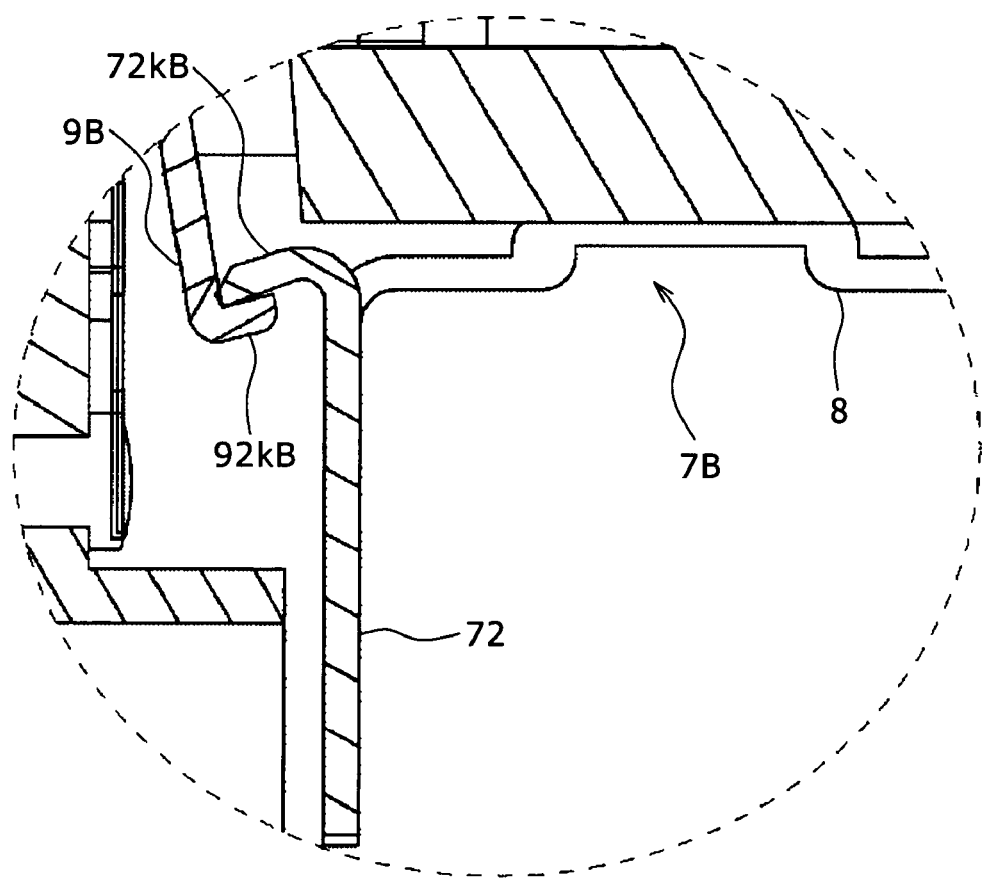
FIG. 24 is a sectional view showing a focusing screen replacement mechanism according to a second embodiment of the present invention.

As shown in FIG. 24, the focusing screen holding member 7 (7B) according to this second embodiment is different from that of the first embodiment in the tip shape of the engagement parts 72$k$. Specifically, the engagement parts 72$k$ (72$k$B) are so bent that the positions thereof gradually become lower in the direction from the backside (the right side in FIG. 24) toward the front side (the left side in FIG. 24). In other words, the engagement parts 72$k$B each have an inclined surface that is so inclined that its surface height is larger on the device backside than on the lens mount part side (front side).

Furthermore, the engagement parts 92$k$ (92$k$B) of the locking member 9 each also have an inclined surface that is so inclined that its surface height is smaller on the front side and larger on the backside, similarly to the engagement parts 72$k$B. That is, the engagement parts 92$k$B each have an inclined surface that is so inclined that its surface height is larger on the device backside than on the lens mount part side (front side).

As shown in FIG. 24, when the focusing screen holding member 7 (7B) is kept at the locked state by the locking member 9 (9B), the engagement parts 72$k$B (specifically, the inclined surfaces thereof) engage with the engagement parts 92$k$B (specifically, the inclined surfaces thereof).

In such a structure, when pressing force toward the device backside is given to the front side portion 72 by a user, the engagement parts 72$k$B will move toward the backside in the horizontal direction. However, because the engagement parts 92$k$B are so inclined that the height thereof is larger on the device backside, comparatively large reaction force acts on the inclined surfaces of the engagement parts 72$k$B from the engagement parts 92$k$B of the locking member 9.

Therefore, the movement of the engagement parts 72$k$B toward the backside is inhibited by the engagement parts 92$k$B if the pressing force toward the device backside by the user is comparatively small.

On the other hand, if the pressing force is comparatively large, the engagement parts 72$k$B get over the reaction force acting thereon from the inclined surfaces of the engagement parts 92$k$B and move toward the upper backside along the inclined surfaces of the engagement parts 92$k$B. Subsequently, upon the separation of the tips of the engagement parts 72$k$B from the tips of the engagement parts 92$k$B, the engagement between both the engagement parts 72$k$B and 92$k$B is released, so that the locked state of the focusing screen holding member 7B by the locking member 9B is released.

As above, comparatively large pressing force should be given in order to release the engagement between both the engagement parts 72$k$B and 92$k$B. Therefore, the engagement between both the engagement parts 72$k$B and 92$k$B can be prevented from being released when a user does not intend to release the engagement. For example, the locked state can be prevented from being released due to only the slight contact of the tip of the jig JG or the like with the front side portion 72. In other words, the locked state of the focusing screen holding member 7 by the locking member 9 can be maintained more surely.

3. Others

Although this is the end of the description of embodiments of the present invention, the present invention is not limited to the above description.

For example, two engagement parts 72$k$ are provided on the front side portion 72 in the above-described embodiment. However, the present invention is not limited thereto, but the single engagement part 72$k$ or three or more engagement parts 72$k$ may be provided on the front side portion 72. In this case, also on the locking member 9, the same number of engagement parts 92$k$ as that of engagement parts 72$k$ are provided at the positions corresponding to those of the engagement parts 72$k$.

Figure 25:
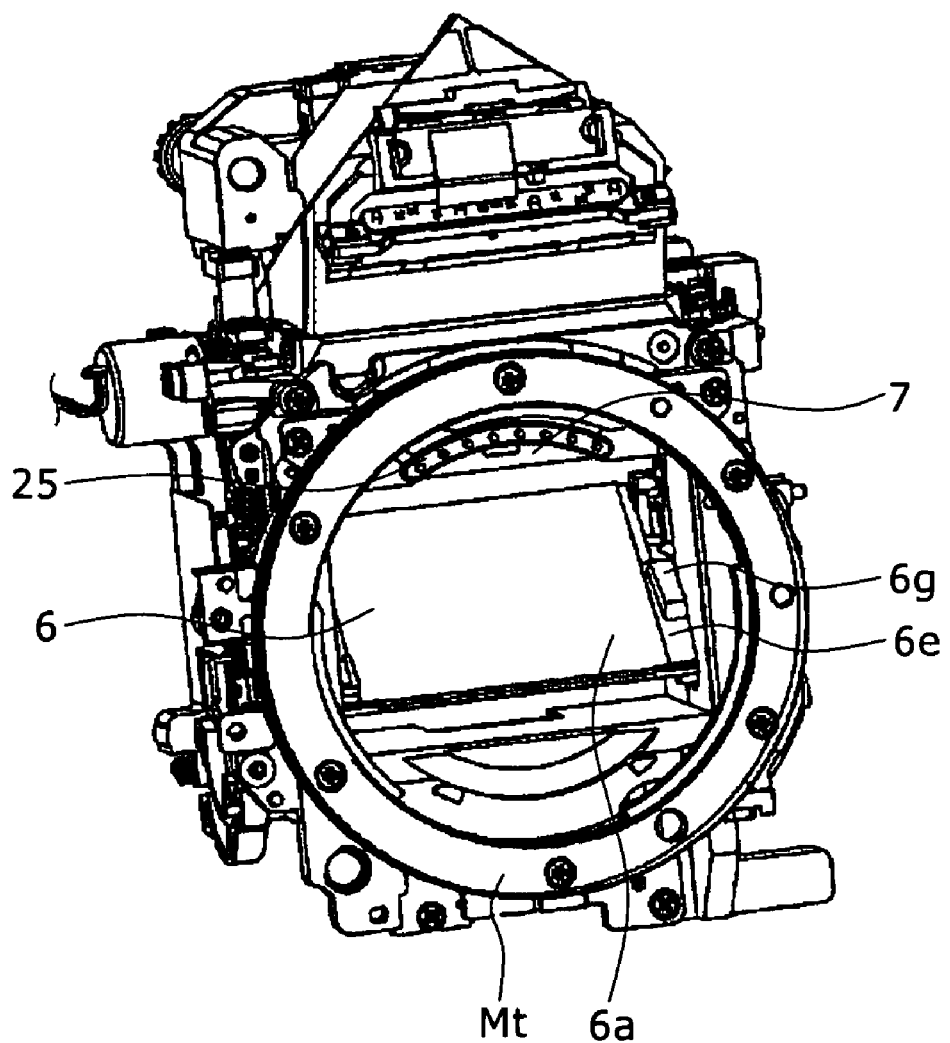
FIG. 25 is a sectional view showing a mirror holding member according to a modification example.

Furthermore, in the above-described embodiment, the vertical width Ws of the stopper parts 72$s$ is larger than the vertical width Wg of the deformation parts 72$g$ and larger than the vertical width Wf of the center part 72$f$. However, the present invention is not limited thereto. For example, the vertical width Ws of the stopper parts 72$s$ may be smaller than the vertical width Wf of the center part 72$f$. However, in this case, it is preferable to prevent the focusing screen holding member 7 (particularly the center part 72$f$) from coming into contact with the mirror plane of the main mirror 6$a$ e.g. by allowing the stopper part 72$s$ to abut against an upward protruding part 6$g$ (see FIG. 25) provided on the mirror holding member 6$e$. Specifically, the total value of the protrusion amount of the protruding part 6$g$ on the mirror holding member 6$e$ (the amount of the protruding from the mirror plane in the thickness direction of the main mirror 6$a$) and the width Ws of the stopper part 72$s$ is set larger than the vertical width Wf of the center part 72$f$.

The present application contains subject matter related to that disclosed in Japanese Priority Patent Application JP 2008-181116 filed in the Japan Patent Office on Jul. 11, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. An imaging device comprising:
    a device main body;
    a focusing screen holding member configured to detachably hold a focusing screen; and
    a locking member configured to be provided between the focusing screen holding member and a lens attachment part of the device main body, wherein
    the focusing screen holding member has a front side plate portion on a lens attachment part side, a rear side portion disposed apart from and extending parallel to the front side plate portion and a pair of lateral side portions disposed apart from and extending parallel to each other and interconnecting the front side plate portion and the rear side portion to form a rectangularly-shaped hollow defining a focusing screen placement plane, the front side plate portion extending perpendicularly relative to the focusing screen placement plane and being elastically deformable to and between a normal condition and an elastically-deformed condition, the front side plate portion being resiliently biased to the normal condition, the front side plate portion having a center plate part having a center plate part width extending perpendicularly to the focusing screen placement plane and a pair of deformation plate parts disposed apart from one another and integrally interconnected by the center plate part, each one of the deformation plate parts having a deformation plate part width extending perpendicularly to the focusing screen placement plane and being smaller than the center plate part width,
    the locking member engages with an engagement part provided on the front side plate portion and locks the focusing screen holding member to maintain a held state of the focusing screen by the focusing screen holding member, and
    if a pressing force toward a device backside is applied to the front side portion, the front side portion moves from the normal condition to the elastically-deformed condition thereby displacing the engagement part towards the device backside in order to disengage the locking member and the engagement part.

2. The imaging device according to claim 1, wherein
    the focusing screen holding member is rotatable about a predetermined axis,
    the locking member engages with the engagement part of the focusing screen holding member and locks the focusing screen holding member to prevent rotational operation of the focusing screen holding member about the predetermined axis and maintain the held state, and
    the focusing screen holding member rotates about the predetermined axis if pressing force toward the device backside is given to the front side portion and engagement between the locking member and the engagement part is released.

3. The imaging device according to claim 1, wherein
    the center plate part has a high rigidity being a comparatively high rigidity over a predetermined range including the engagement part along a longitudinal direction of the front side plate portion, and each one of the pair of deformation plate parts has a low rigidity being a comparatively low rigidity on opposing sides of the center plate part in the longitudinal direction.

4. The imaging device according to claim 1, wherein
    each one of the pair of lateral side portions includes a connecting part and an elastic force giving part that is integrally connected to the connecting part and gives elastic force for pressing the focusing screen upward in the held state.

5. The imaging device according to claim 1, further comprising:
    a mirror configured to reflect an optical image from a photographic optical system and lead the optical image to the focusing screen; and
    a mirror holding member configured to hold the mirror, wherein
    the front side plate portion has a pair of bump parts at opposing ends in a longitudinal direction of the front side plate portion, respective ones of the pair of bump parts are integrally connected to respective ones of the deformation plate parts,
    the focusing screen holding member rotates about a predetermined axis and is shifted to a replacement-possible state in which replacement of the focusing screen is possible, if engagement between the locking member and the engagement part is released, and
    in the replacement-possible state, respective ones of the pair of bump parts abut against the mirror holding member and contact between the focusing screen holding member and the mirror is avoided.

6. The imaging device according to claim 1, wherein
    the locking member has an inclined surface that is so inclined that height is larger on the device backside than on the lens attachment part side, and
    the engagement part is so inclined that height is larger on the device backside than on the lens attachment part side, and the engagement part engages with the inclined surface in the held state.

7. A focusing screen replacement mechanism comprising:
    a focusing screen holding member configured to detachably hold a focusing screen, the focusing screen holding member having a front side plate portion, a rear side portion disposed apart from and extending parallel to the front side plate portion and a pair of lateral side portions disposed apart from and extending parallel to each other and interconnecting the front side plate portion and the rear side portion to form a rectangularly-shaped hollow defining a focusing screen placement plane, the front side plate portion extending perpendicularly relative to the focusing screen placement plane and being elastically deformable to and between a normal condition and an elastically-deformed condition, the front side portion being resiliently biased to the normal condition, the front side plate portion having a center plate part having a center plate part width extending perpendicularly to the focusing screen placement plane and a pair of deformation plate parts disposed apart from one another and integrally interconnected by the center plate part, each one of the deformation plate parts having a deformation plate part width extending perpendicularly to the focusing screen placement plane and being smaller than the center plate part width; and
    a locking member configured to engage with an engagement part provided on the front side portion of the focusing screen holding member and lock the focusing screen holding member to maintain a held state of the focusing screen by the focusing screen holding member, wherein if a pressing force in a first direction for separating the front side portion from the locking member is applied to the front side portion, the front side portion moves from the normal condition to the elastically-deformed condition thereby displacing the engagement part towards the device backside in order to disengage the locking member and the engagement part.

* * * * *